US012565168B2

(12) United States Patent
Fox-Rabinovitz et al.

(10) Patent No.: US 12,565,168 B2
(45) Date of Patent: Mar. 3, 2026

(54) EMERGENCY MARKER DEPLOYMENT SYSTEM

(71) Applicant: Torc Robotics, Inc., Blacksburg, VA (US)

(72) Inventors: Joseph R. Fox-Rabinovitz, Blacksburg, VA (US); William Davis, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 121 days.

(21) Appl. No.: 18/411,887

(22) Filed: Jan. 12, 2024

(65) Prior Publication Data

US 2025/0229738 A1 Jul. 17, 2025

(51) Int. Cl.
*B60R 19/48* (2006.01)
*G06F 21/04* (2006.01)

(52) U.S. Cl.
CPC .................................. *B60R 19/483* (2013.01)

(58) Field of Classification Search
CPC ......... B60R 19/483; G06F 21/04; G06F 7/18; G06F 13/16
See application file for complete search history.

(56) References Cited

U.S. PATENT DOCUMENTS

| | | | |
|---|---|---|---|
| 3,788,268 A | * | 1/1974 | Hiatt ........................ E01F 9/662 |
| | | | 116/63 P |
| 4,825,192 A | * | 4/1989 | Wells ...................... B60R 19/38 |
| | | | 280/765.1 |
| 7,108,446 B2 | | 9/2006 | Clark |
| 8,072,345 B2 | | 12/2011 | Gallo |
| 10,529,147 B2 | | 1/2020 | Gordon et al. |
| 10,625,662 B1 | * | 4/2020 | Wechsler ................. B60Q 7/00 |
| 10,773,643 B1 | | 9/2020 | Patnaik |
| 10,812,960 B2 | | 10/2020 | Weinfield |
| 11,366,476 B2 | | 6/2022 | Vawter et al. |
| 11,579,633 B1 | | 2/2023 | Haslam et al. |
| 2005/0072350 A1 | * | 4/2005 | Aasgaard ................. B60Q 1/52 |
| | | | 340/471 |
| 2018/0186283 A1 | | 7/2018 | Fischer et al. |
| 2018/0319494 A1 | | 11/2018 | Aflatoon |
| 2019/0047467 A1 | * | 2/2019 | Kim ........................ F16M 13/00 |
| 2021/0394674 A1 | | 12/2021 | Price et al. |
| 2022/0144166 A1 | * | 5/2022 | Hamm ................... B64U 80/86 |
| 2022/0169260 A1 | | 6/2022 | Strobel |
| 2022/0383665 A1 | | 12/2022 | Waterman et al. |

* cited by examiner

*Primary Examiner* — Tan Q Nguyen
(74) *Attorney, Agent, or Firm* — Armstrong Teasdale LLP

(57) ABSTRACT

An autonomous vehicle is disclosed. The autonomous vehicle comprises a frame including a support frame; at least one marker supported on the support frame; a marker deployment system including a placement device for locating each of the at least one markers from the support frame at a desired location relative to the vehicle; and an autonomy system that includes a controller, a processor, and a memory device, the memory device stores instructions that when executed by the processor transmit signals to the device causing the device to locate each of the at least one markers at the desired location relative to the autonomous vehicle.

20 Claims, 25 Drawing Sheets

EMERGENCY MARKER DEPLOYMENT SYSTEM

TECHNICAL FIELD

The field of the disclosure relates generally to emergency marker deployment in a vehicle, and more specifically, to an automated emergency marker deployment system and method for a vehicle.

BACKGROUND

An Autonomous Driving System (ADS) is any system that is partially or fully capable of driving a vehicle without the aid, assistance, or intervention of a human driver. In 2014, Society of Automotive Engineers (SAE) International created the SAE Levels of Driving Automation as a classification system for autonomous vehicles with the goal of providing greater clarity and transparency on the subject of autonomous technology. SAE's classification system consists of five levels of autonomy. At Level 0 Autonomy, the vehicle is incapable of autonomous driving and is controlled solely by a human driver. Level 1 Autonomy is characterized as one aspect of the driving process being taken over in isolation, using data from sensors and cameras, but the driver retains control of the vehicle. At Level 2 Autonomy, computers take on many of the driver's responsibilities, such as steering, however, a driver always must be present in the vehicle to take control in the event of an emergency and must keep a continual eye on the system. At Level 3 Autonomy, all aspects of driving are handled by the ADS, but the driver must be present at all times in case an intervention request is made. At Level 4 Autonomy, the ADS is capable of driving fully autonomously in proper settings without the assistance or intervention of a human driver. However, if a driver takes control of the vehicle, the ADS will disengage. At Level 5 Autonomy, the ADS is able to drive in known environments that can be navigated by a human driver. At Level 5, the ADS must be capable of managing all scenarios on its own and executing the entire dynamic driving task.

Autonomous vehicles employ four fundamental technologies: perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration. Information collected using perception and localization technologies may be used not only for safe driving of the autonomous vehicle. Accordingly, there is a need of applications in which the information collected using perception and localization technologies may be used.

Information collected using perception and localization technologies may be used in an autonomous vehicle after the vehicle completes an emergency stop and thereby achieve increased vehicle courtesy to other drives and limit risk. When a vehicle makes an emergency stop such as by exiting the road, pulling off on the side of the road or braking in the lane, driving regulations and laws require the vehicle driver to place markers near the stopped vehicle. The markers serve to alert approaching vehicles of the presence of the stopped vehicle. Drivers are typically required to use three markers to identify the stopped vehicle. When a non-autonomous or semi-autonomous vehicle, such as a tractor trailer driven by a human driver, makes an emergency stop, the driver exits the vehicle and manually places the emergency markers, such as triangles, near the vehicle and trailer in the required locations. For example, when a vehicle is stopped on a two-lane road with traffic in both directions, the driver locates one marker 100 feet in front of the vehicle, a second marker 10 feet behind the vehicle and a third marker 100 feet behind the vehicle.

In a fully autonomous vehicle there is no human driver. As a result, when the autonomous vehicle makes an emergency stop and the use of vehicle markers is required, there is no human driver in the autonomous vehicle to locate the markers relative to the vehicle. Accordingly, there is a need for a system for deploying markers in an autonomous vehicle when the autonomous vehicle executes an emergency stop.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect an autonomous vehicle comprises: a frame including a support frame; at least one marker supported by the support frame; a marker deployment system, the marker deployment system including a placement device for locating each of the at least one markers from the support frame to a desired location relative to the vehicle; and an autonomy system, the autonomy system including a processing system comprising a processor, and a memory device, the memory device storing instructions that when executed by the processor transmit signals to the placement device causing the placement device to locate each of the at least one markers at the desired location relative to the autonomous vehicle.

In another aspect a system for detecting an emergency stop in an autonomous vehicle and locating at least one marker relative to the autonomous vehicle in response to the emergency stop, comprises: at least one sensor positioned along the autonomous vehicle, the at least one sensor for collecting operation-related data for the autonomous vehicle; a marker deployment system comprising a placement device for locating the at least one marker in a desired location relative to the autonomous vehicle; an autonomy system, the autonomy system including a processing system comprising a processor, and a memory device, the memory device storing instructions that when executed by the processor cause the processing system to: receive, from the at least one sensor, at least one sensor signal representing operation-related data for the autonomous vehicle; based on the received data, determine if an emergency stop has been performed by the autonomous vehicle; and if an emergency stop has been performed; control the device of the marker deployment system to locate the at least one marker to a desired location relative to the vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1A:
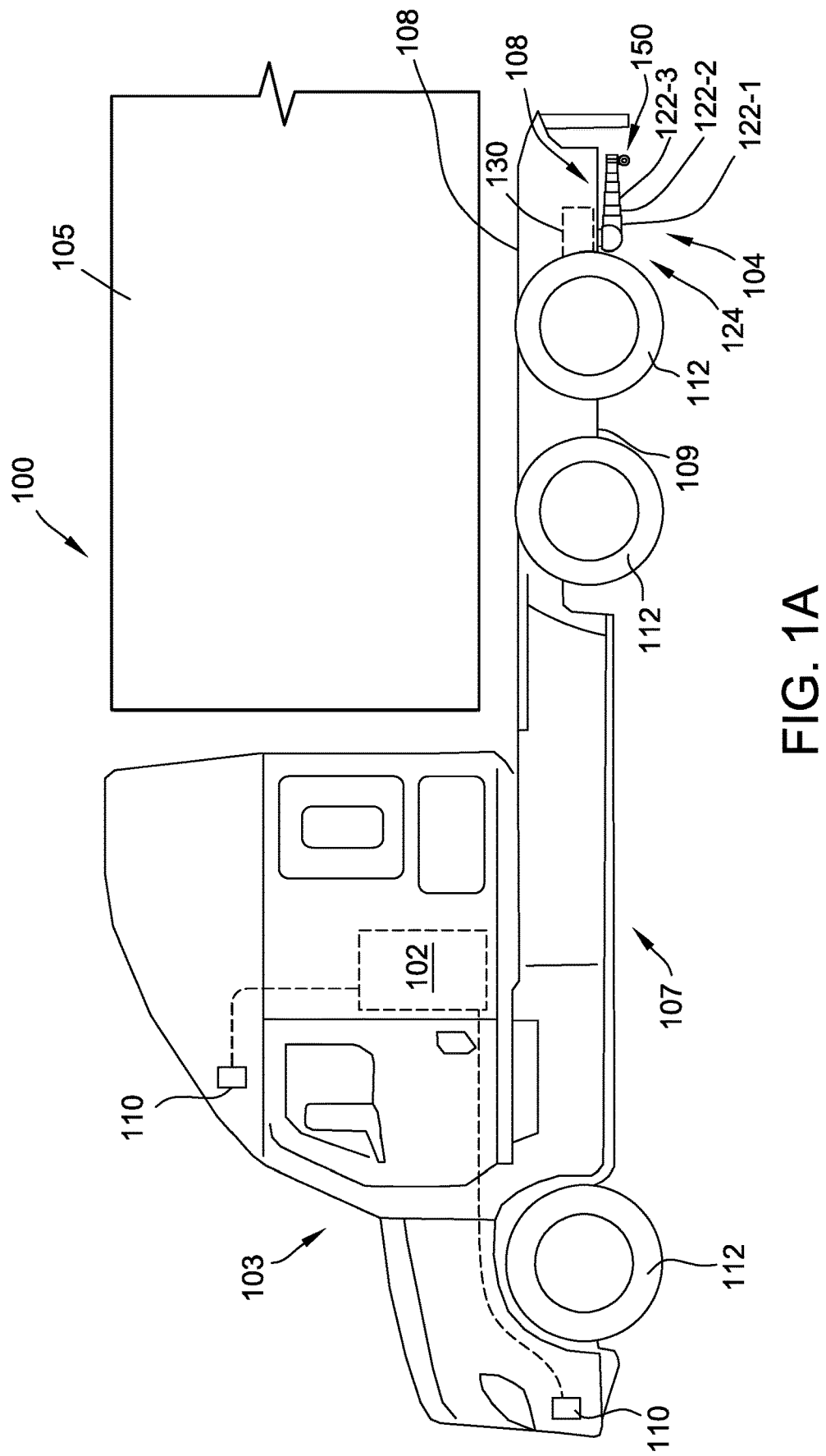
FIG. 1A is a schematic view of a vehicle such as a truck that includes a marker deployment system with a marker deployment arm in a retracted orientation according to embodiments of the present disclosure.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

An example technical effect of the methods, systems, and apparatus described herein includes at least one of: (a) a marker deployment system for autonomous vehicles; (b) a marker deployment system for an autonomous vehicles that places markers in the required marker locations based on the vehicle location immediately after a specific emergency stop maneuver has been completed; (c) a marker deployment system that uses any of a mechanical arm, remote controlled vehicular or aerial drone to place the markers; (d) self-stabilizing markers per se, and (e) a marker deployment system that utilizes self-righting markers.

The following detailed description and examples set forth preferred materials, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform a number of driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Mission control: Mission control, also referenced herein as a centralized or regionalized control, is a hub in communication with one or more autonomous vehicles of a fleet. Human agents, or artificial intelligence-based agents, positioned at mission control may monitor data or service requests received from the autonomous vehicle and may dispatch a rescue vehicle (also referenced herein as a service vehicle) at the autonomous vehicle's location.

An emergency stop occurs when a vehicle maneuver is executed that is intended to minimize potential risk to the vehicle and/or to other vehicles on the road. Such an emergency stop may include, but is not limited to exiting the road, pulling off on the side of the road or braking in the lane. As described in the present disclosure, a semi-autonomous vehicle, or a non-autonomous vehicle, such as a semi-autonomous truck or a non-autonomous truck, needs a human driver to operate the vehicle.

FIG. 1 illustrates a vehicle 100 which includes a tractor 103 and a trailer 105. The vehicle 100 may be a non-autonomous vehicle or a semi-autonomous vehicle. The trailer 105 and tractor 103 are supported by a frame or chassis 107. The frame 107 is in turn supported by wheels 112 to thereby support and steer the vehicle along a road and in a direction of interest. The frame includes a top frame portion 108 and a bottom frame portion 109. The autonomy system 102 may be used to control the vehicle 100 and/or plan movement of the vehicle. A marker deployment system 104 is supported by the frame. 107. For purposes of describing the exemplary embodiment of the disclosure the autonomous marker deployment system 104 is supported along the bottom frame portion. The functionality of the system 104 is controlled by the autonomy system 102. Sensors 110 are mounted at various locations along the exterior of the vehicle tractor 103, the trailer 105 or the frame 107 and collect information, data, etc. relating to vehicle operation and the vehicle surroundings. The collected information is continuously communicated to the autonomy system 102 by the sensors 110 and the autonomy system 102 processes the information to determine if an emergency stop has occurred creating the immediate need to cause the marker deployment system 104 to locate markers near the vehicle 100. In some embodiments, the sensors 110 may include radio detection and ranging (RADAR) devices, light detection and ranging (LiDAR) sensors, cameras, and acoustic sensors. The sensors 110 may further include an inertial navigation system (INS) configured to determine states such as the location, orientation, and velocity of the autonomous vehicle 100. The INS may include at least one global navigation satellite system (GNSS) receiver configured to provide positioning, navigation, and timing using satellites. The INS may also include at least one inertial measurement unit (IMU) configured to measure motion properties such as the angular velocity, linear acceleration, or orientation of the autonomous vehicle 100.

As will be further disclosed herein through the preferred embodiments of the present disclosure, the marker deployment system 104 is used to locate markers in the desired locations relative to the vehicle 100. Drivers are required to place markers must be located around the vehicle 100 to warn other drivers approaching the vehicle 100 that the vehicle is unexpectedly stopped ahead. The markers are located in the required locations relative to the vehicle 100 in response to a completed emergency stop, and a determination of the location of the vehicle based on sensor data. Additionally, the markers must be in place around the vehicle soon after the emergency stop has been completed. For example, markers may need to be located around the vehicle within ten minutes after the emergency stop.

Figure 2:
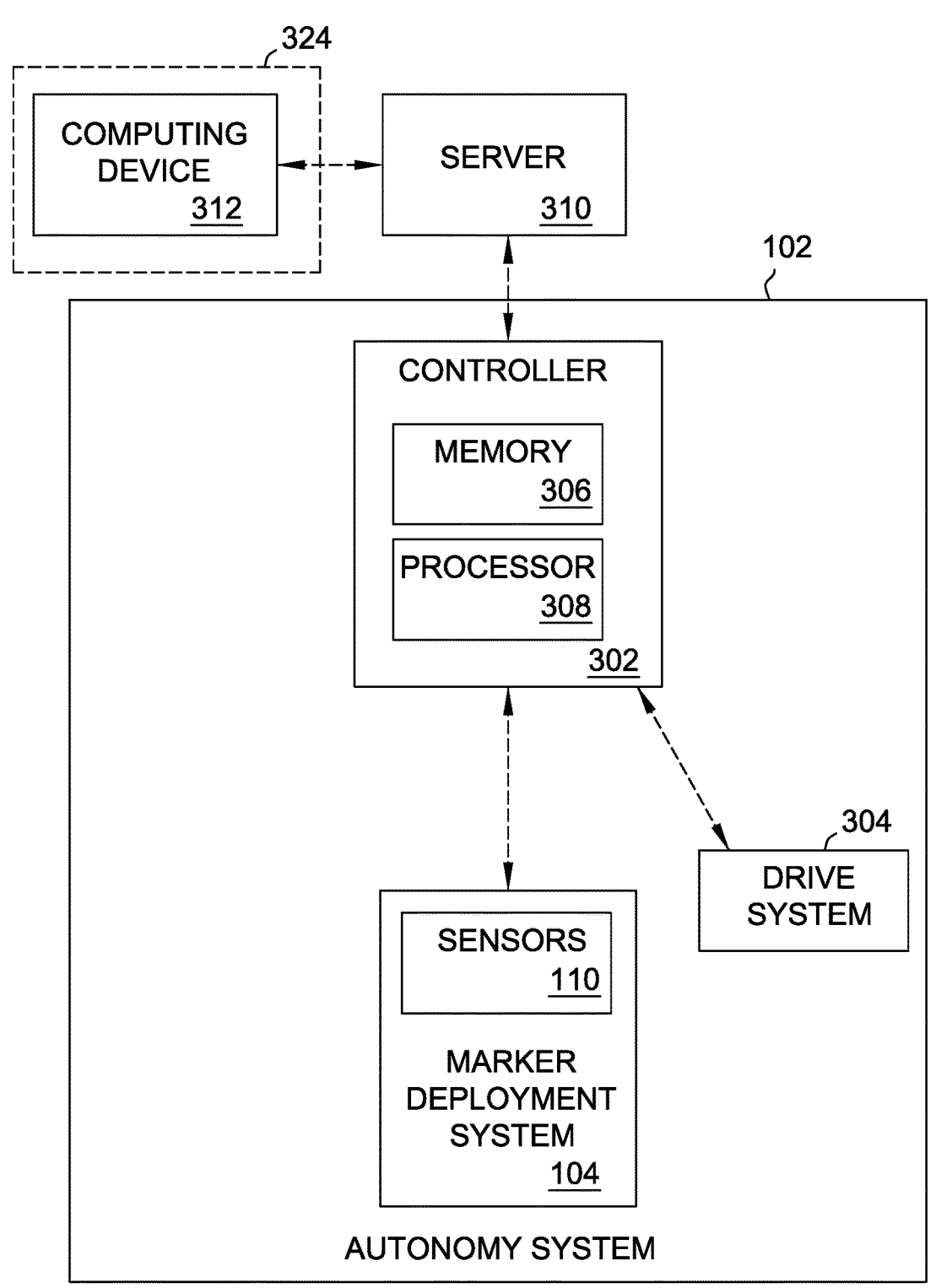
FIG. 2 is a schematic view of an autonomy system for use with the vehicle of FIG. 1A-1E to control the marker deployment system according to embodiments of the present disclosure.

FIG. 2 is a schematic of the autonomy system 102 for use with the vehicle 100. The autonomy system 102 may be used with any embodiment of the marker deployment system 104 as described herein. The autonomy system 102 includes a processing system 302 in communication with the marker deployment system 104. The processing system 302 may also be in communication with a drive system 304 to autonomously control movement of the vehicle 100. The processing system 302 may be one or more processing systems. The processing system 302 includes a memory 306 and a processor 308. The memory 306 may be any device allowing information such as executable instructions and/or data to be stored and retrieved. The processor 308 may include one or more processing units to retrieve and execute instructions and/or data stored by the memory 306.

The autonomy system 102 may use signals received from the one or more sensors 110 of the drive system 304. Additionally, the autonomy system 102 may use signals received from a server 310. The server 310 may be in communication with a computing device 312, such as, but not limited to, a user computing device (such as for manual remote control of the marker deployment system 104) and/or another vehicle in communication with the vehicle 100 to send and/or receive signals between vehicles. In some embodiments, the computing device may be a mission control computing system 324 that transmits control commands or data to the autonomous vehicle 100, such as navigation commands, and travel trajectories to the autonomous vehicle 100, and may also communicate commands for controlling the operation of the marker deployment system 104.

Additionally, or alternatively, mission control-based computing device 312 may receive processed or unprocessed sensor data from the autonomous vehicle 100, when the autonomous vehicle 100 determines, based upon analysis of the sensor data, that an emergency stop has been completed. The sensor data collected and sent to the computing device 312 by the autonomy system 102 may include data relating to the position and location of the autonomous vehicle 100 at the completion of the emergency stop. For example, the data may indicate that the trailer 105 of the vehicle 100 is at least partially located: a) in two lane traffic, 400 in FIG. 7A, or b) along a divided highway or one way road, 402 in FIG. 7B, or c) stopped in a location where oncoming motorists view is obstructed such as on a hill or on a curve 404 in FIG. 7C. The collected data may also be sent to the autonomy system 102. Either the autonomy system 102 or mission control-based computing device 312 may be used to control the marker deployment system consistent with the sensed data. Operation of the system 104 will be further described below. No matter where the vehicle makes the emergency stop, the autonomy system will have a map of the road available, for example the map may be stored in memory 306, so that the autonomy system can effectively determine the required locations for the markers. Additionally, the map may be a pre-computed map, or one that is constructed from the sensor data that is most recently collected prior to the emergency stop.

The autonomy system 102 may control the deployment of markers 600 of the marker deployment system 104. For example, the deployment of markers such as emergency markers may be based on the occurrence of an emergency stop by the vehicle 100. The emergency stop enables the vehicle 100 to reach a state that reduces the danger for the vehicle and other road users. An emergency stop can be performed abruptly or after pulling off the road, moving the vehicle to the shoulder of the road, or stopping the vehicle in the lane. The one or more sensors 110 may detect the vehicle has stopped at a location that does not comprise an aspect of the vehicle travel plan that may be stored in the memory 306 of the processing system 302. The processor 308 may compare the detected behavior of the vehicle to planned travel routes, location of the vehicle, expected speeds or other performance data, with threshold values, data, etc. stored in the memory 306 to identify if an emergency stop has been completed. If it is determined that an emergency stop has been completed markers 600 will be deployed by automatic deployment system 104. The determination of whether or not to deploy the markers 600 is made by the controller shortly after the processor determines for example, within ten minutes of the vehicle exhibiting behavior.

Figure 1B:
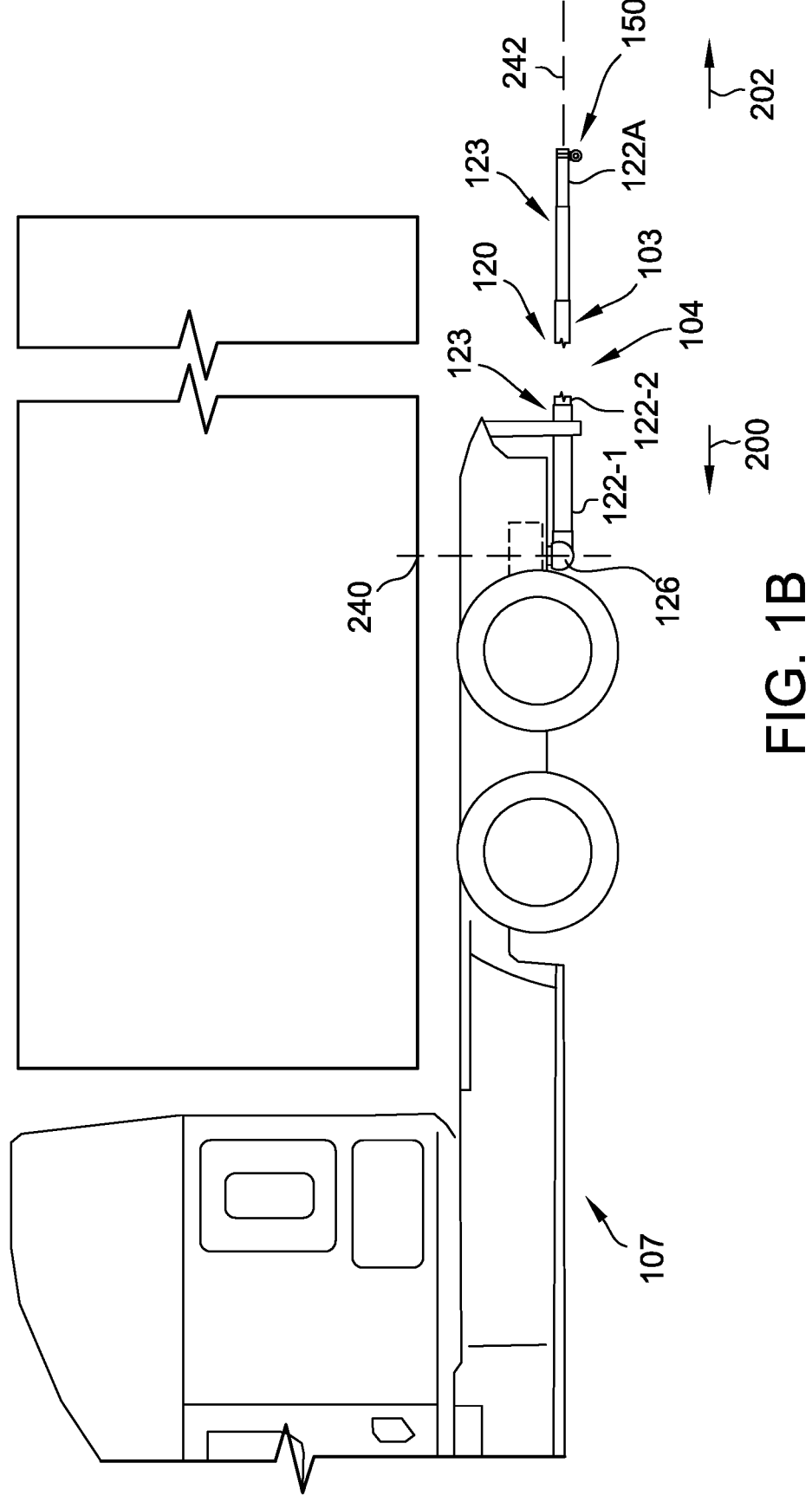
FIG. 1B is a schematic view of a vehicle as shown in FIG. 1B that includes a marker deployment system with a marker deployment arm in an extended orientation according to embodiments of the present disclosure.
Figure 5:
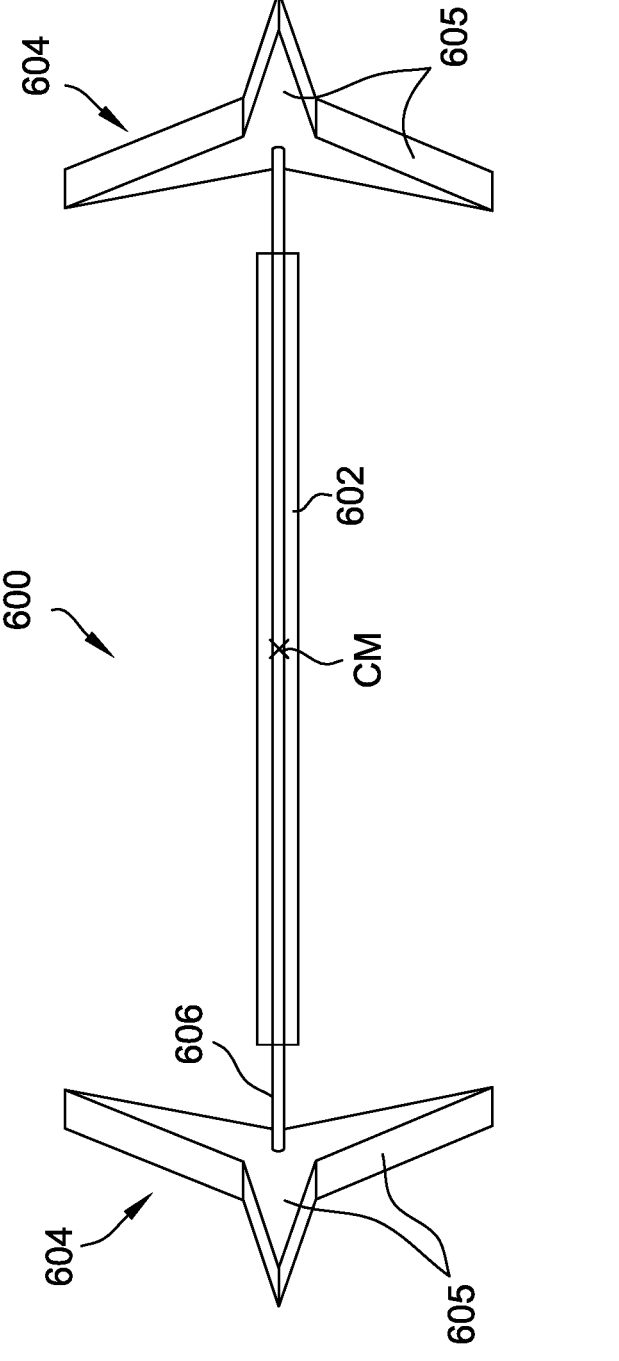
FIG. 5 is a top view of the marker of FIG. 4.

An embodiment of the marker deployment system 104 is shown in FIGS. 1A-1E and 3. The embodiment of marker deployment system 104 shown in FIGS. 1A-1E and 3 includes a marker placement device that comprises an arm 120 comprised of a plurality of movable telescoping tubes 122-1, 122-2, 122-3 . . . 122-n. The telescoping tubes may be retracted and stowed between uses. An exemplary retracted orientation is shown in FIG. 1A. Alternatively, the tubes may be moved from their respective nested orientations to assume an extended orientation. An exemplary extended orientation is shown in FIG. 1B. The arm is movably connected to the bottom frame portion 109 of the chassis 107 but may be connected to the frame in any suitable location. The arm 120 includes 'n' telescoping tubes 122, wherein 'n' is the number of tubes necessary to extend the arm 120 to the length required for the marker deployment system to effectively locate markers 600 at the required locations relative to vehicle 100. The fully extended length may be 100 feet for example. As the description of the arm 120 of the present embodiment of the marker system 104 proceeds, directional terms such as "upstream" and "downstream" will be used when referencing the telescoping tubes 122 and their relative displacement. As shown in FIG. 2, the upstream direction is identified by upstream directional arrow 200 and the downstream direction is identified by downstream directional arrow 202. The tubes are shown as being cylindrically shaped in cross-section, however it should be understood that the tubes 122 may have any configuration or cross-sectional shape, such as rectangular, triangular, etc. that enables the telescoping tubes 122 to be effectively retracted and extended as described in the exemplary embodiment of the disclosure while maintaining the necessary structural rigidity. Due to the relatively long extended length of the arm 120, a wheel or other member 150 may be connected to tube 122-n to provide support to the end of the arm when the arm is extended and enable smooth relocation or movement of the arm. The wheel is shown in FIGS. 1, 2 and FIG. 5. In some embodiments, a wheel or other member may be connected to the end of more than one tube among tubes 122-1 through 122-n.

A displacement control member/device (not shown) may be provided at the open end 123 of each telescoping tube 122 to impede the displacement of the moving, downstream tube 122 tube relative to the upstream tube and thereby prevent the moving telescoping tube from undesirably separating from the upstream tube. For example, using the telescoping tube reference numbers included in FIG. 1A, the displacement control member would prevent downstream tube 122b from separating from upstream end 123 of tube 122-1. The displacement control member may comprise an annular member that is located at the open end 123 of the upstream telescoping tube (122-1 for example) and extends radially and partially across the open end. A radially outwardly extending contact member (not shown) may be made integral with the upstream end of the moving telescoping tube (122-2 for example). When the downstream tube (122-2) is extended and the upstream end of the tube 122-2 is proximate the open end 123 of the upstream member (122-1), the contact member of tube 122-2 contacts the annular member of tube 122-1 and thereby prevents further displacement of the upstream tube 122-2. Although tubes 122-1, 122-2 were specifically referenced to describe methods for impeding tube displacement, it should be understood that the structure and functionality of the displacement control member described also applies to each of the plurality of telescoping tubes 122-3 . . . 122n.

Each downstream tube nests within the tube that is immediately upstream from the associated downstream tube, for example, tube 122-2 nests within tube 122-1, tube 122-3 nests within tube 122-2, etc. When the each of the tubes is nested in an adjacent upstream tube, the arm 120 is in a stowed or retracted orientation, as shown in FIG. 1A. Telescoping tubes may extend starting from the tube with the largest magnitude cross sectional area and ending with the tube with the smallest magnitude cross sectional area. In the exemplary embodiment, the tube with the largest magnitude cross sectional area is tube 122-1, and the tube with the smallest magnitude cross sectional area is tube 122n. Therefore, as the arm extends, tube 122-1, with all the smaller cross-sectional stages nested inside it moves first and completes its stroke before the next stage begins to move. This method is repeated for each stage until the smallest-diameter stage 122n is fully extended. Conversely, when retracting, the smallest-diameter stage 122n will retract fully before the next stage starts to move. This continues until all stages are nested back into the main.

The upstream end of tube 122-1 is fixed to a prime mover 124. Generally, the prime mover serves to rotate the arm 120 about rotation axis 240. A hydraulic or pneumatic system (not shown) or other similar system using pressurized fluid to enable displacement of the tubes, may be used to enable the extension and retraction of the tubes 122-1 . . . 122-n. The hydraulic or pneumatic system may include a number of valves that are opened and closed as required to produce the desired extension or retraction of the system 104. During operation, signals may be sent to hydraulic system valves, to selectively open and close the valves as required to produce the flow and pressurization of the fluid to extend and retract the tubes. The tubes are retracted and extended along displacement axis 242. The arm may be rotated about the axis at any required magnitude angle. Axes 240 and 242 are shown in FIG. 2. FIGS. 1A-1E illustrate different locations along the frame 107 for attaching the arm 120 and associated one or more telescoping tubes 122-1 to 122-n to the frame 107. As shown in FIGS. 1A and 1B, the arm may be connected to the frame proximate the rear end of the frame.

Figure 1C:
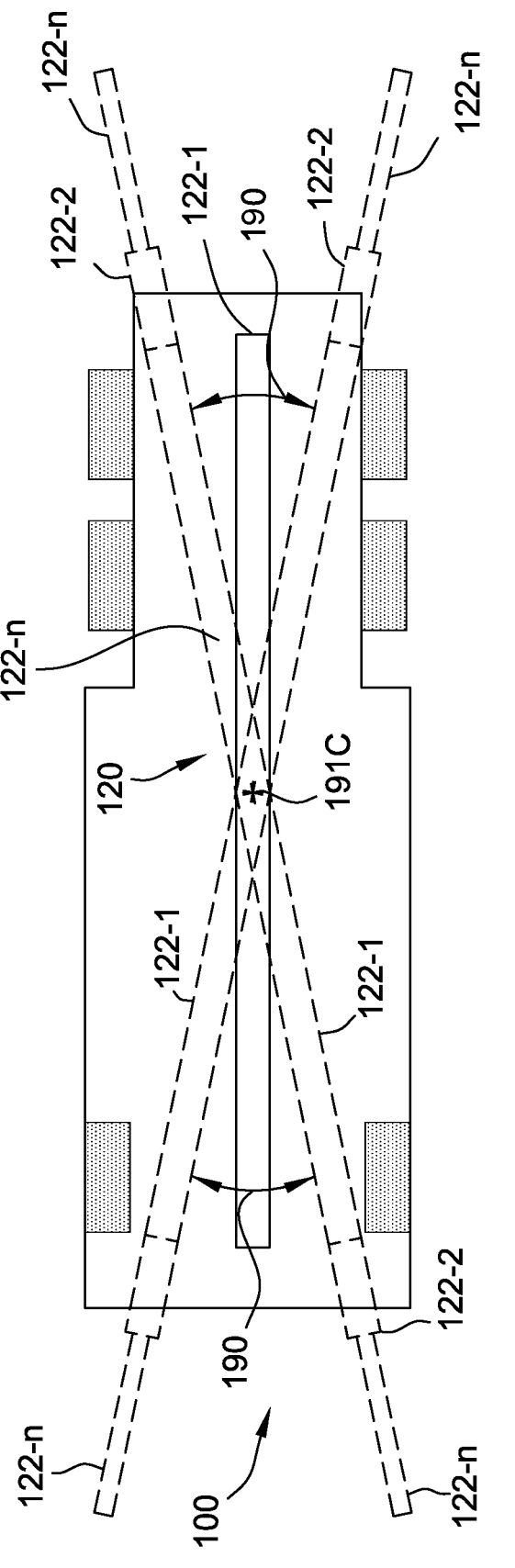
FIG. 1C is a schematic view of the bottom of the vehicle of FIG. 1A showing an alternate mounting location of the marker deployment arm.

As shown in FIG. 1C, the arm 120 may be attached to the frame at pivot location 191C which is substantially half the longitudinal distance between the front and rear of the vehicle 100. In the alternate exemplary embodiment of FIG. 1C, the arm includes telescoping tubes that are extendable and retractable at both ends of the arm 120. The tubes 122-1, 122-2 122-n of the arm 120 of FIG. 1C are oriented and function in a manner similar to the arm of FIGS. 1A and 1B described herein. The telescoping structure of the arm in FIG. 1C terminates at tube 122-n. The arm 120 rotates at an angle 190 to locate the markers 600 at the required location of the vehicle.

Figure 1D:
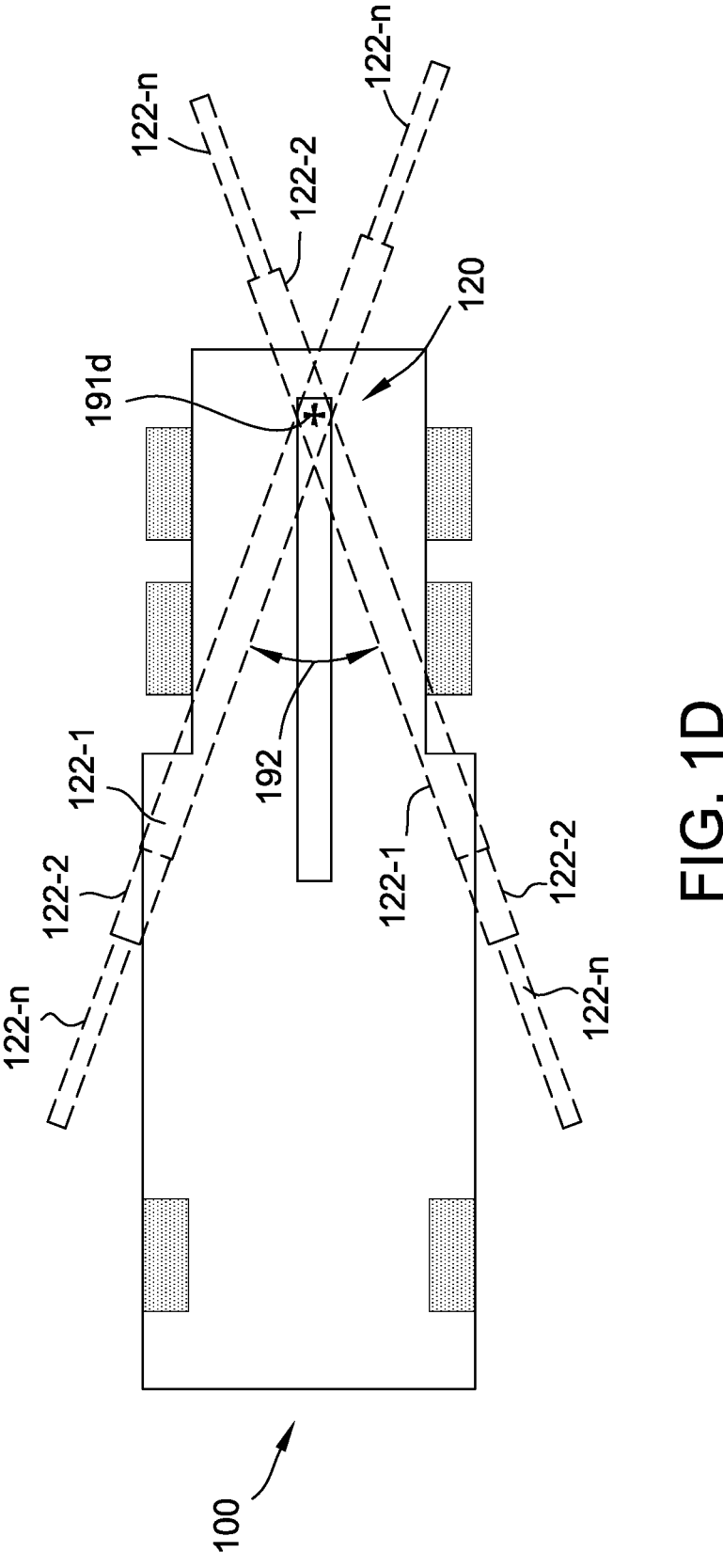
FIG. 1D is a schematic view of the bottom of the vehicle of FIG. 1A showing an alternate mounting location of the marker deployment arm.

As shown in FIG. 1D, the arm 120 may be attached to the frame at pivot location 191D which is located proximate the rear of the vehicle 100. In the alternate exemplary embodiment of FIG. 1D, the arm includes telescoping tubes that are extendable and retractable at both ends of the arm 120. The tubes 122-1, 122-2 . . . 122-n of the arm 120 of FIG. 1D are oriented and function in a manner similar to the arm of FIGS. 1A and 1B described herein. The telescoping structure of the arm 120 shown in FIG. 1D terminates at tube 122-*n*. The arm 120 rotates at an angle 192 to locate the markers 600 at the required location of the vehicle.

Figure 1E:
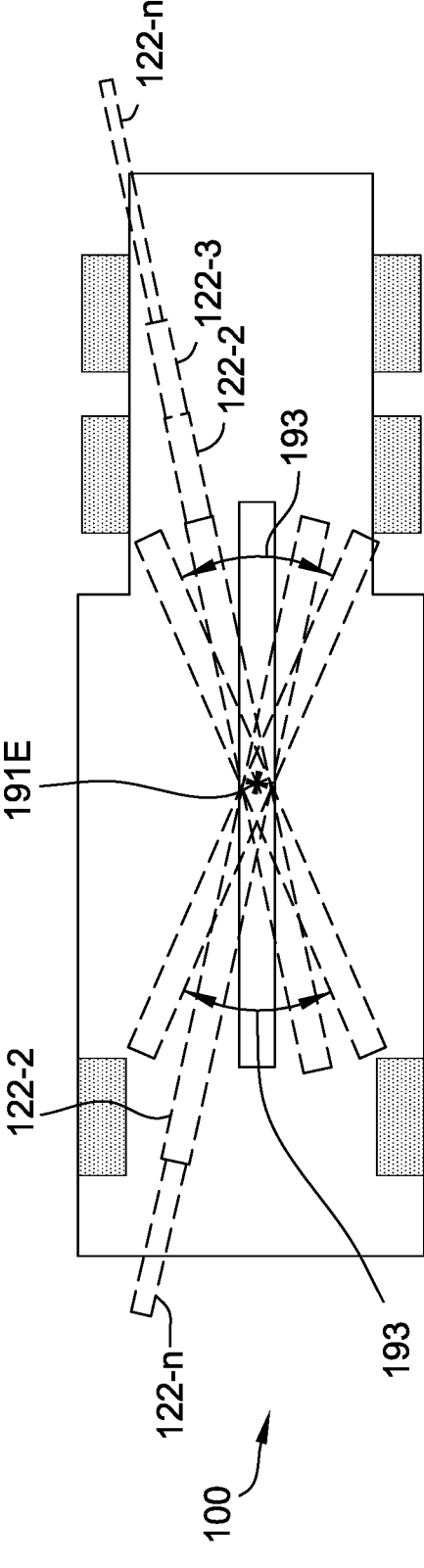
FIG. 1E is a schematic view of the bottom of the vehicle of FIG. 1A showing an alternate mounting location of the marker deployment arm.

As shown in FIG. 1E, the arm 120 may be attached to the frame at pivot location 191D which is located nearer the front of the vehicle 100. In the alternate exemplary embodiment of FIG. 1E, the arm includes telescoping tubes that are extendable and retractable at both ends of the arm 120. The tubes 122-1, 122-2, 122-3 . . . 122-*n* of the arm 120 of FIG. 1E are oriented and function in a manner similar to the arm of FIGS. 1A and 1B described herein. The telescoping structure of the arm 120 shown in FIG. 1E terminates at tube 122-*n*. The arm 120 rotates at an angle 193 to locate the markers 600 at the required location of the vehicle. Angle 193 is the greatest angle of displacement of the arm 120 in FIG. 1E given the limitations on displacement created by the wheels. The alternate locations for mounting the arm 120 shown in FIGS. 1A-1E are provided as exemplary locations for connecting the arm to the vehicle frame. Any suitable location may be used for locating the arm 120 along the vehicle frame 107. The suitable arm location may be based on the dimensions of the vehicle frame, the systems and structural components along the bottom of the frame that might limit displacement of the arm, the distance between the vehicle wheels, etc. The length and location of the pivot location are specifically defined and implemented for the specific vehicle 100 that will include the marker deployment system 104. The length and location of the arm selected enable the arm 120, in retracted/stowed configuration to fit between the vehicle wheels and make a full 360-degree rotation about axis 240 as shown in FIGS. 1A and 1B. In the embodiments shown in FIGS. 1C, 1D and 1E, the arm is sized and located to enable the arm to make partial rotations with extendable/retractable telescoping tubes provided on both arm ends.

It should be understood that as the description proceeds, the configuration of arm 120 shown in FIGS. 1A and 1B will be used.

Specifically, the tube 122-1 is connected to the prime mover 124 at a prime mover hub 126 and the hub 126 is in turn connected to a motor 130. The motor may be any suitable motor including a vibration motor or a battery powered motor. For purposes of specifically describing an exemplary embodiment of the disclosure, a battery powered motor will be generally described. The battery of the motor 130 may be recharged by the power that is supplied to the truck 100 by the drive system 304. The motor is energized and receives a from the processing system 302 to cause the hub to rotate in the desired direction, clockwise or counterclockwise about axis of rotation 240. When the arm 120 is in the retracted/stowed orientation the length of the retracted arm may be between 6 feet and 8 feet, and preferably comprises a length that is less than the distance separating the wheels along opposite sides of the vehicle 100. By limiting the stowed length of the arm to the distance separating opposed wheels 112, the arm will be able to rotate below chassis 107 without contacting wheels 112 and enable the arm to be oriented to as required to effectively locate markers in the front and rear locations relative to the vehicle 100. If based on the dimensions of the vehicle 100 it is not possible to limit the stowed length of the arm to enable the arm to be rotated between front and rear directed orientations, a configuration as shown in FIGS. 1C, 1D and 1E, with telescoping members 122-1 . . . 122-*n* at both ends of the arm may be used.

Figure 3:
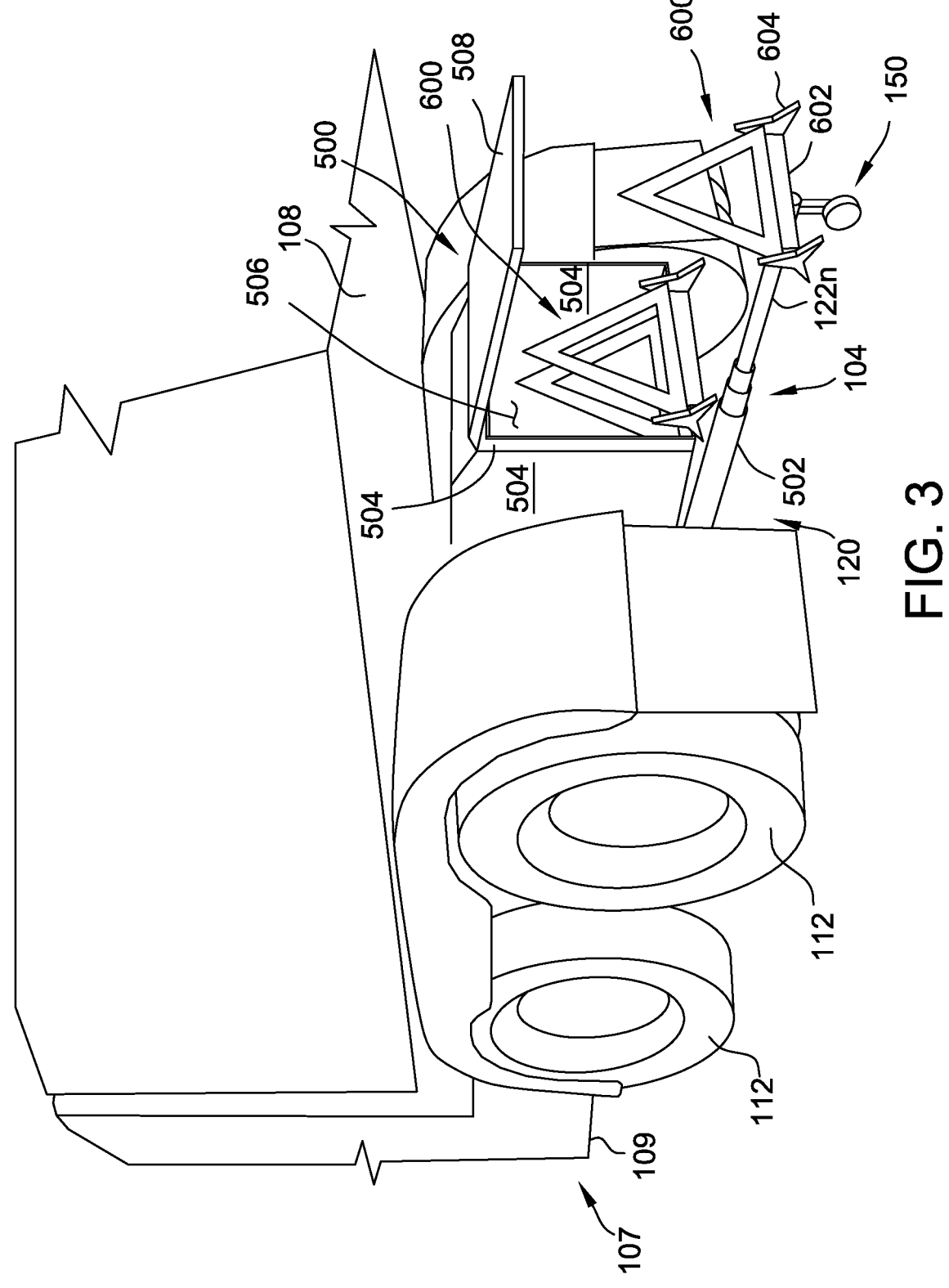
FIG. 3 is a rear view of the vehicle of FIG. 1 showing the marker support base and exemplary markers located on the support base.

Provided along chassis 107 is marker support frame 500. The support frame may be a separate structure formed with the chassis or formed in the chassis. The marker support frame includes a base 502 and upper and side walls 504 made integral with the base 502 The walls and base define a chamber 506. The chamber may be open at both ends to enable the arm 120 to approach the chamber from the upstream or downstream end of the support base 500 to remove the markers 600 from the chamber 506. The chamber 506 is adapted to house a number of markers 600. See FIG. 3. The chamber may be defined as described or be comprised of just a base, with the markers 600 located on the base. A door 508 may be movably connected, by a hinge, sliding, collapsing, accordion or other connection for example, to one of the walls 504 of the frame 500. A door may be provided at each of the open ends of the chamber 506. As shown in FIG. 3, the door 508 is attached by a hinge to the top wall 504. The door may be selectively positioned between a closed position, where the door closes the chamber and thereby protects the markers from damage between uses and maintains the markers in the chamber during operation of the vehicle 100, and an open position, as shown in FIG. 3, enabling the markers to be removed from the chamber by the arm 120. During operation, when it is necessary to open one or both doors 508, a signal may be sent by controller 302 to a servo motor (not shown), spring latch, or other device to open the doors 508. After the markers have been returned to the chamber, a signal may be sent to the motors to close the doors, or the operation may be done manually as part of a procedure by the truck's rescuers. At the free end 123 of the tube 122-*n* a hook, magnet, or other component (not shown) may be provided. The hook, magnet or other component picks a marker from the chamber 506, maintains the marker at the end of the tube 122-*n* while the arm is moving to the desired marker location, and releases the marker when the arm is in the deployment location. It should be understood, that if an arm 120 with telescoping members 122 at both ends of the arm is used, such as the arms 120 disclosed in FIGS. 1C-1E, two support frames 500 will be formed in the frame 107 so that markers 600 may be deployed from the support frame proximate the associated arm end.

As will be further described below, markers 600 include a counterweight 602 and supports 604, that are connected to the ends of rotatable axle 606. The axle is seated in a groove formed in the top of the counterweight 602 and is rotatable in the groove. The supports 604 rotate with the axle. When located in the chamber 506, the supports 604 are located on the floor 502 to support the markers in the chamber 506. Alternatively, the markers may be hung on a rod near the top of chamber 506.

Figure 4:
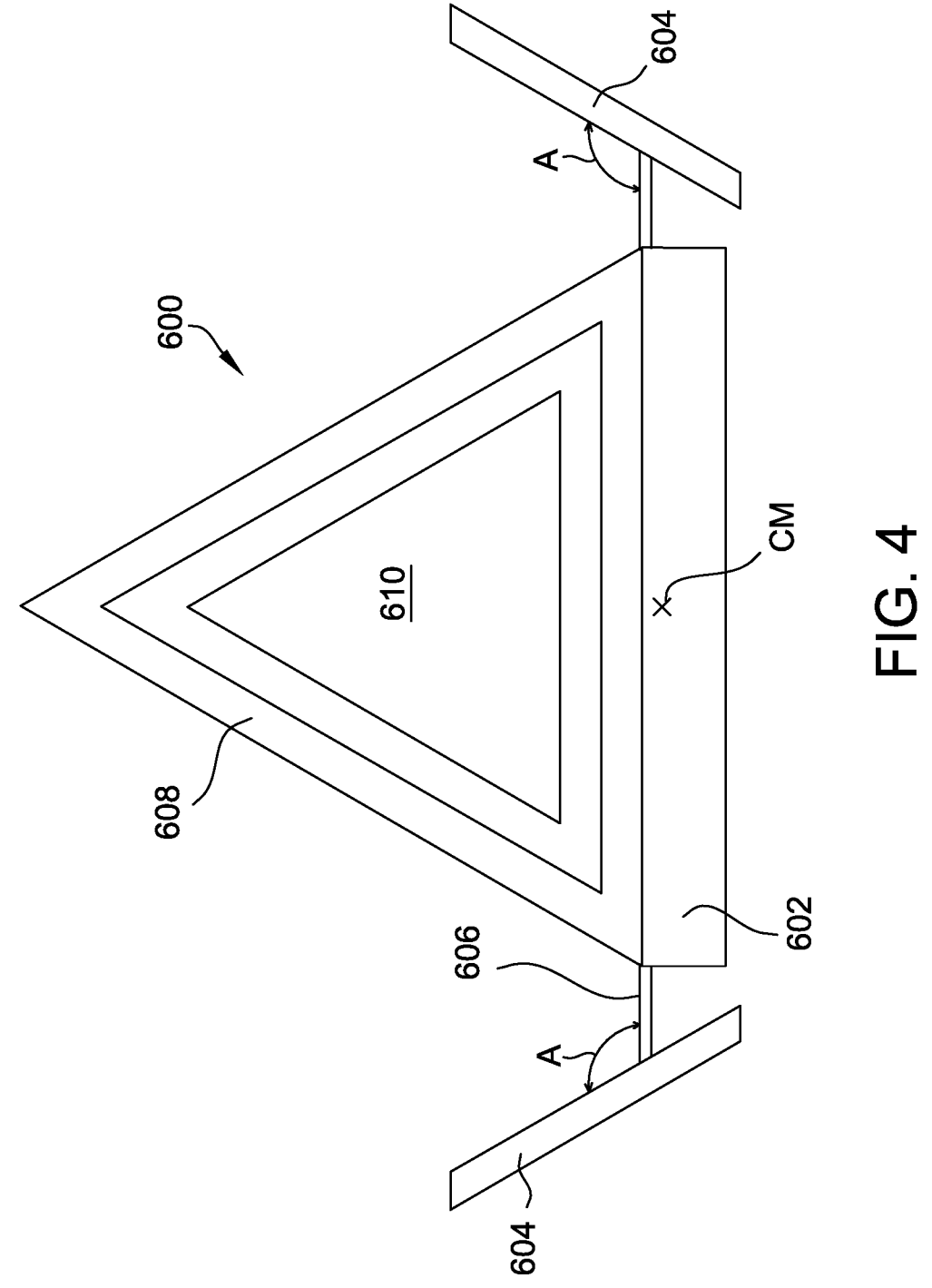
FIG. 4 is a front view of a marker for use in a marker deployment system according to embodiments of the present disclosure.

Marker 600 is shown in FIGS. 4, 5 and 6. Marker 600 may be any marker that is self-righting and can effectively identify a vehicle after the vehicle has completed an emergency stop. However, it is preferred that the marker 600 be a marker that is approved for use by the Department of Transportation with a vehicle, such as autonomous vehicle 100. The marker 600 includes a marker body 608 that has a central opening 610. The marker body 608 is shown as triangle-shaped but it should be understood that the body 608 may comprise any suitable configuration. The body 608 is lightweight typically weighing less than 0.5 lb. The body may be made of a thin plastic, wood or a cloth material. If necessary, a cloth material is supported by a frame that may be made from any suitable material comprising a metal, plastic or wood. The edge of one side on the body is rigidly fixed to a counter-weight 602, using a conventional adhesive material or fastener. As combined, the body and counterweight are a self-stabilizing system. As a self-stabilizing system, the system returns to the desired vertical orientation shown in FIG. 4 when placed in any orientation other than the desired vertical orientation. The counterweight can also be integrally connected to the body, as a single unitary member. For example, the counterweight may comprise a metal rod inserted into a groove (not shown) provided in the body 608. The counterweight 602 has a rectangular shape and is measurably heavier than the body 608. The counterweight may have any suitable cross-sectional shape. The counterweight 602 may be five times the weight of the marker body. The counterweight may weigh about 2.5 lb. The counterweight may be made from steel, tungsten, lead, etc. The heavier counterweight provides stability to the marker against any disruptive forces such as, wind when the marker is located on the road.

Figure 6A:
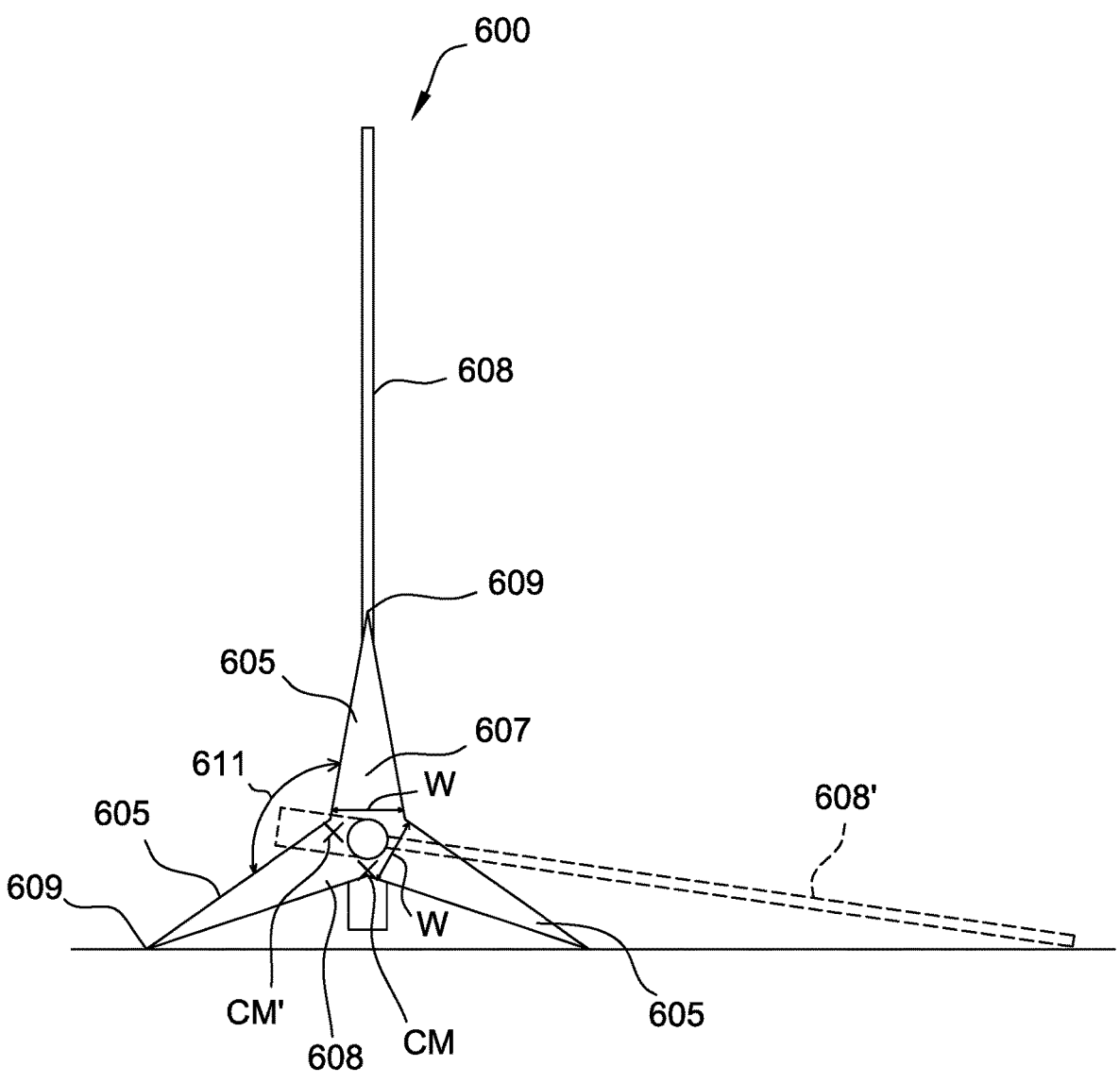
FIG. 6A is a side view of the marker of FIG. 4 showing the marker in a stable upright and self-rectifying tilted positions.
Figure 6C:
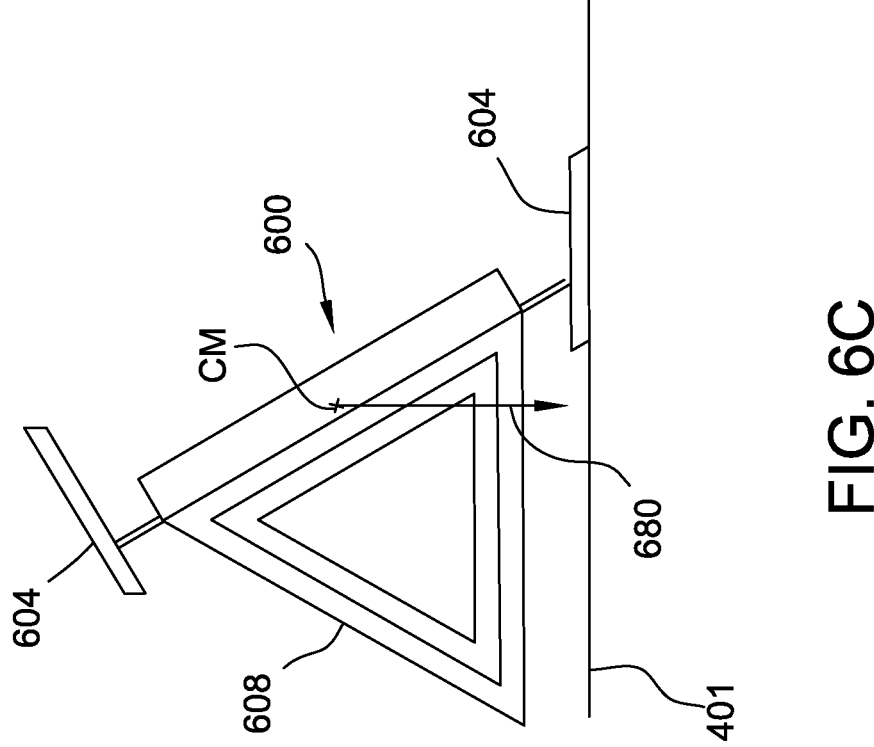
FIGS. 6B and 6C are front views of the marker of FIG. 4 illustrating the self-rectifying capabilities when the marker lands on a support member when it is deployed on a road.
Figure 6B:
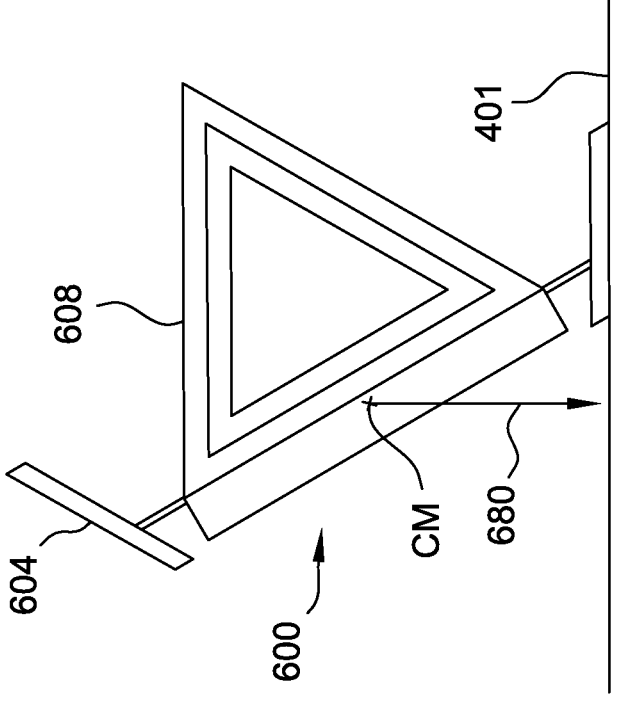

The center of mass CM of marker 600 is located below the axle 606. Locating the CM below the axle enables self-righting and self-stabilization of the body 608. The marker 600 shown in FIGS. 6A-6C illustrates the self-righting attribute of the marker 600. Because the CM is not coincident with axle 606, when the position of body 608' in FIG. 6A is not in the desired vertical orientation as represented by the position of body 608, the gravitational pull on center of mass CM' of the marker induces a counter-clockwise torque, causing the body 608 to self-right and return to the vertical orientation.

Supports 604 have three legs 605 that are spaced apart by each adjacent leg by an angle 611. The supports have a substantially flat outer face. The supports are rigidly connected to the axle to be rotatable with the axle. Because of the angle A defined between the supports 604 and rotatable rod or axel 606, in combination with the location of the CM, regardless of how the marker lands on the road, gravity acting on the CM of the marker produces a stabilizing torque that moves the marker to the upright orientation shown in FIG. 4. FIGS. 6B and 6C illustrate this benefit associated with the features and structure of the marker 600. If the marker is deployed and the marker inadvertently lands on either support 604 face as shown in the FIGs, gravity, represented by arrow 680 acts on the CM, to produce a torque that moves the marker to the upright orientation of FIG. 4. The supports 605 can be any polygon or other shape that provides the required stability to the marker 600. For example, the supports may have a triangular shape.

In the present embodiment of the marker 600, the legs are spaced apart by equal angles of 120 degrees. Each leg has a base portion 607 proximate the axle. The base portion has a length "w" shown in FIG. 6A. Extending radially outwardly from the center of the support 604 where the support connects to the axle 606, the leg tapers from base length "w" to a relatively sharp edge 609. As a result, each leg 607 has a triangle shape. As shown in FIG. 4 the supports 604 form angles A with the axle 606. The angle A is greater than ninety degrees, however angle A may have any angle that will produce a marker 600 with self-righting functionality. To maximize the self-stabilization attributes of the marker 600, the angle A should not be 90 degrees. The angled orientation of the supports and sharp-edges 609 in each support leg 605 provide further stability to the marker 600. Additionally, the three-legged configuration of the supports prevents the marker from being obscured when viewed from the side as shown in FIG. 6A.

Figure 7A:
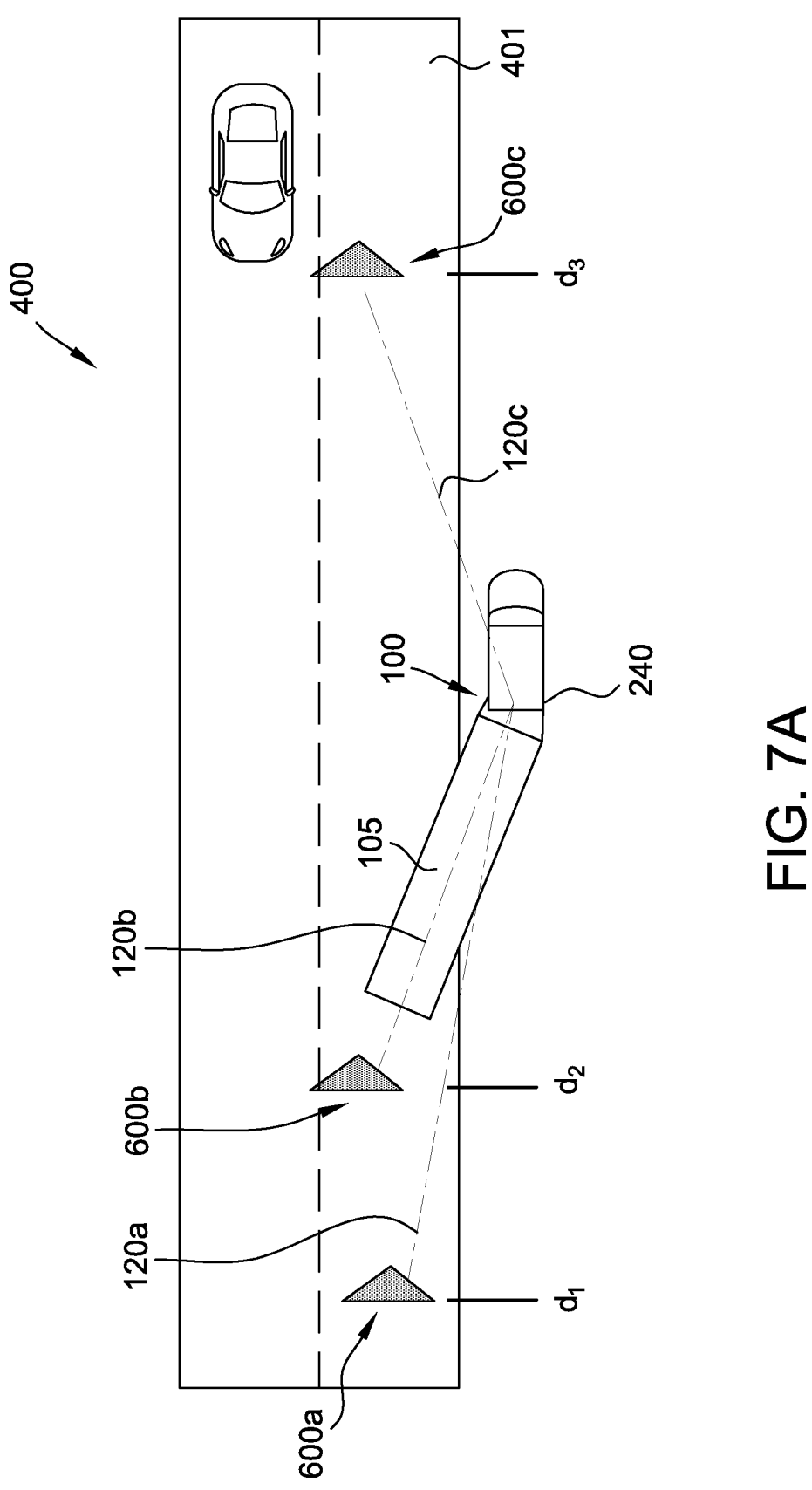
FIGS. 7A-7C disclose various vehicle exemplary emergency stops and the locations of the markers placed near the vehicle by the marker deployment system in response to the emergency stops according to embodiments of the present disclosure.
Figure 7B:
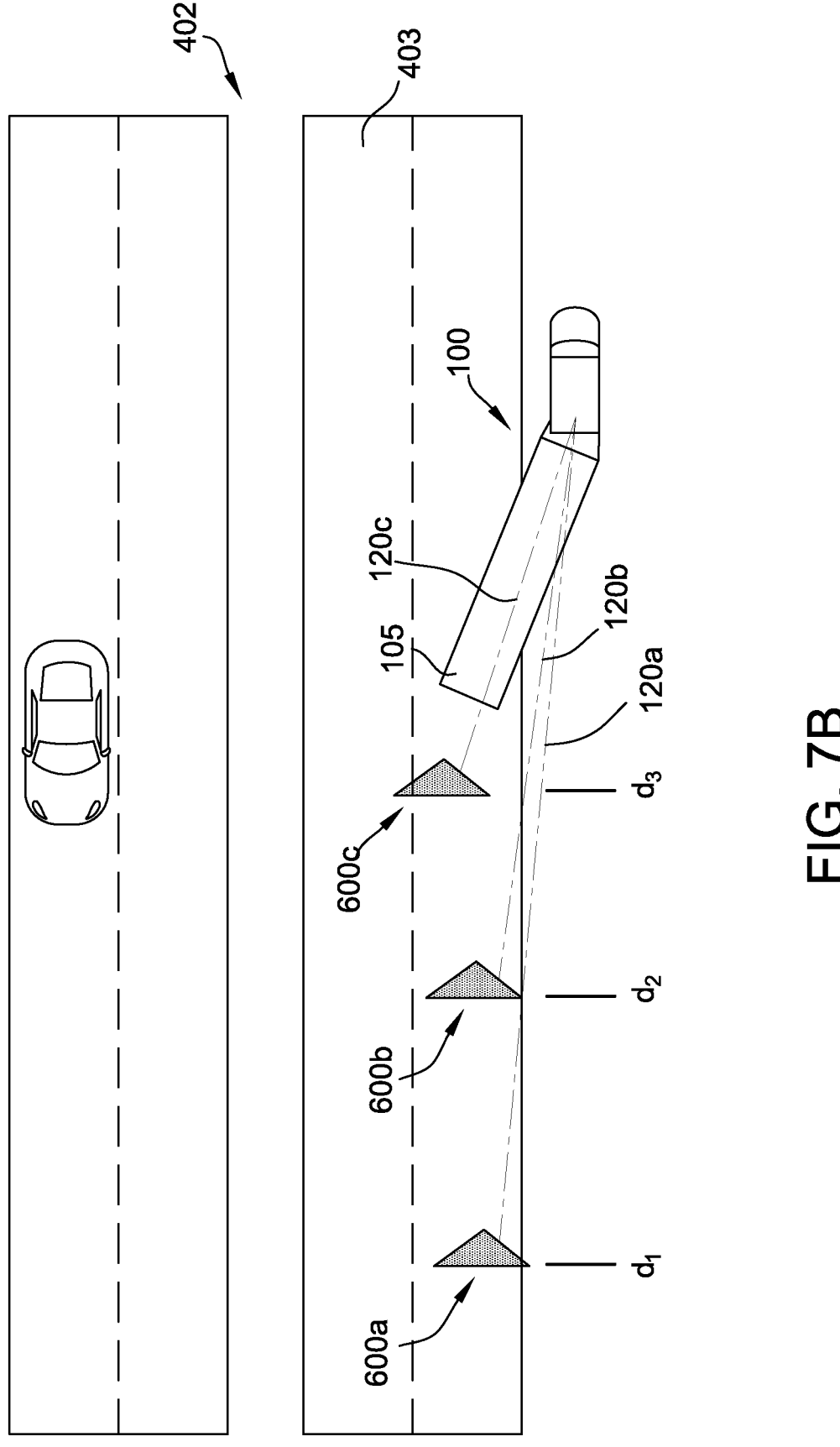
Figure 7C:
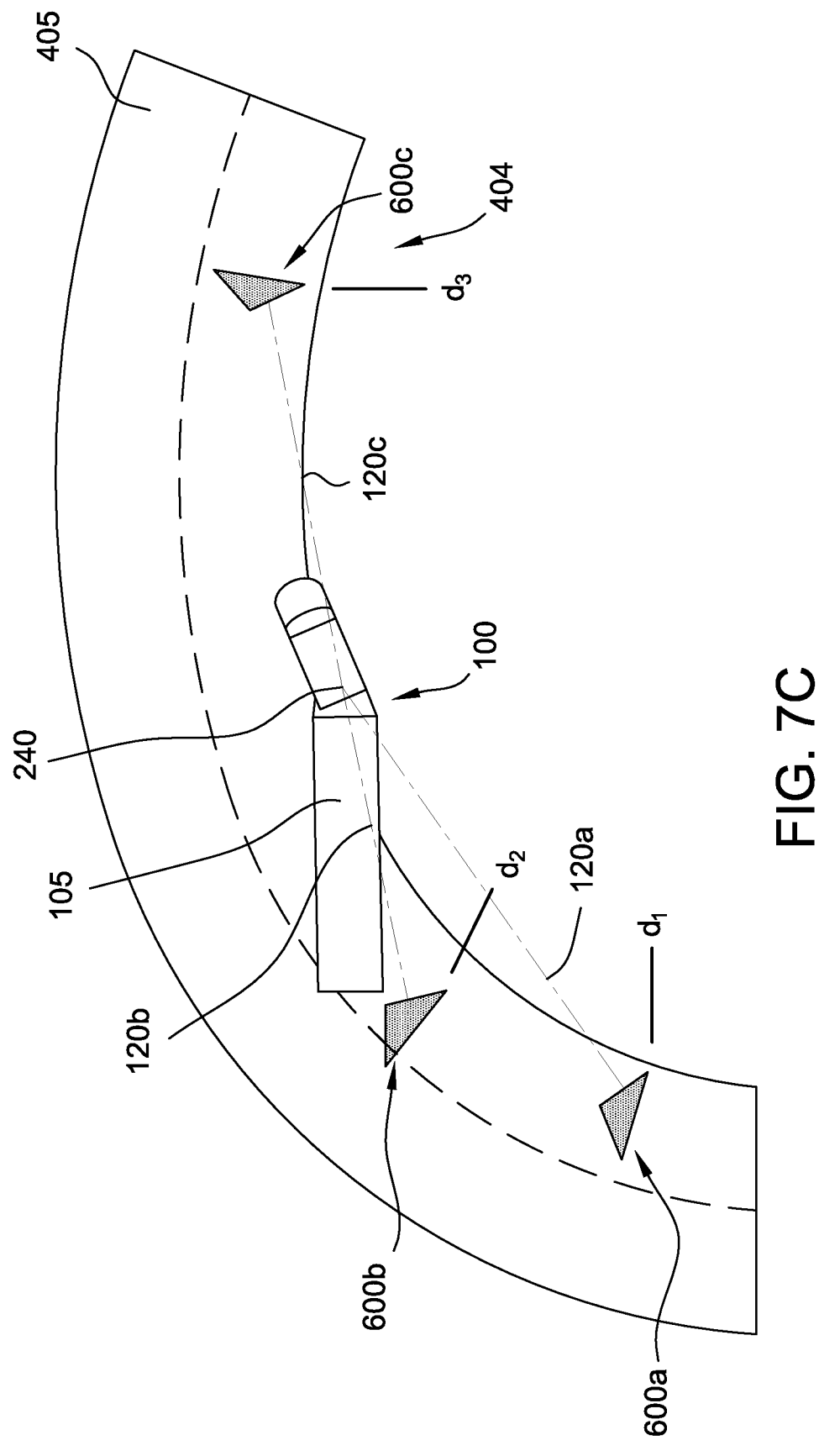
Figure 8A:
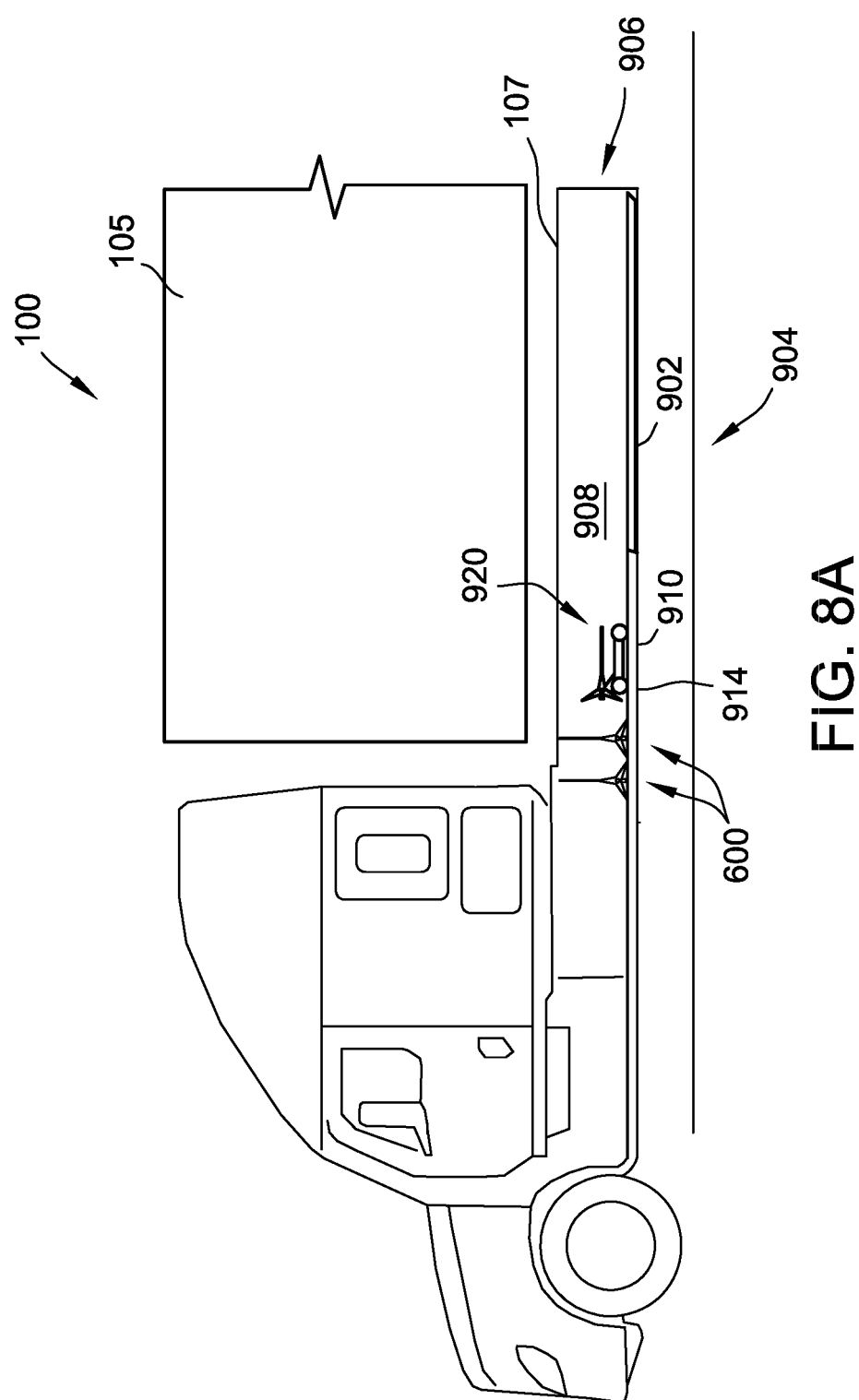
FIGS. 8A-8D are schematic views of a vehicle such as a truck that includes an alternate embodiment marker deployment system utilizing a controllable vehicle that travels along the road to deploy markers according to embodiments of the present disclosure.
Figure 8B:
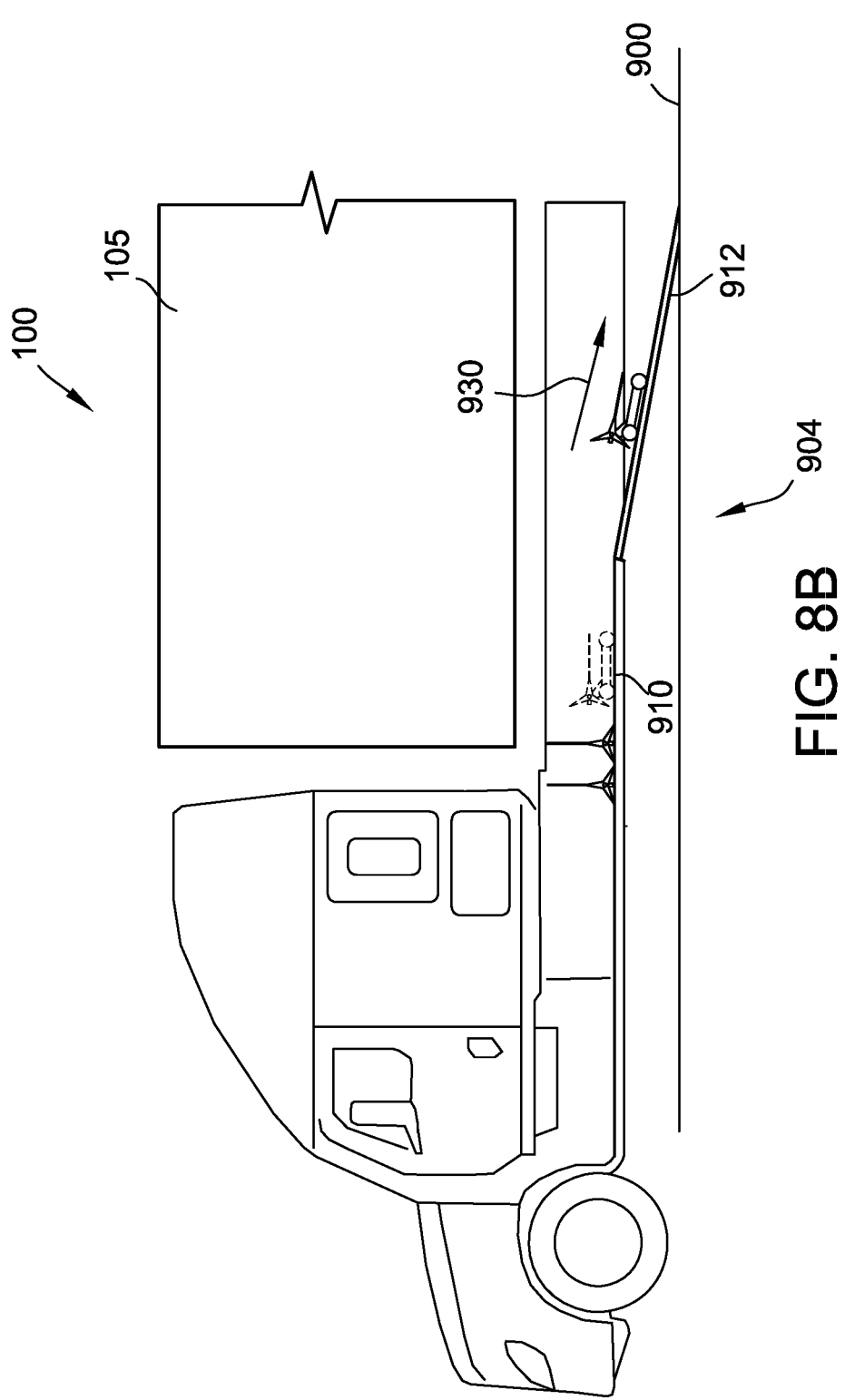
Figure 8C:
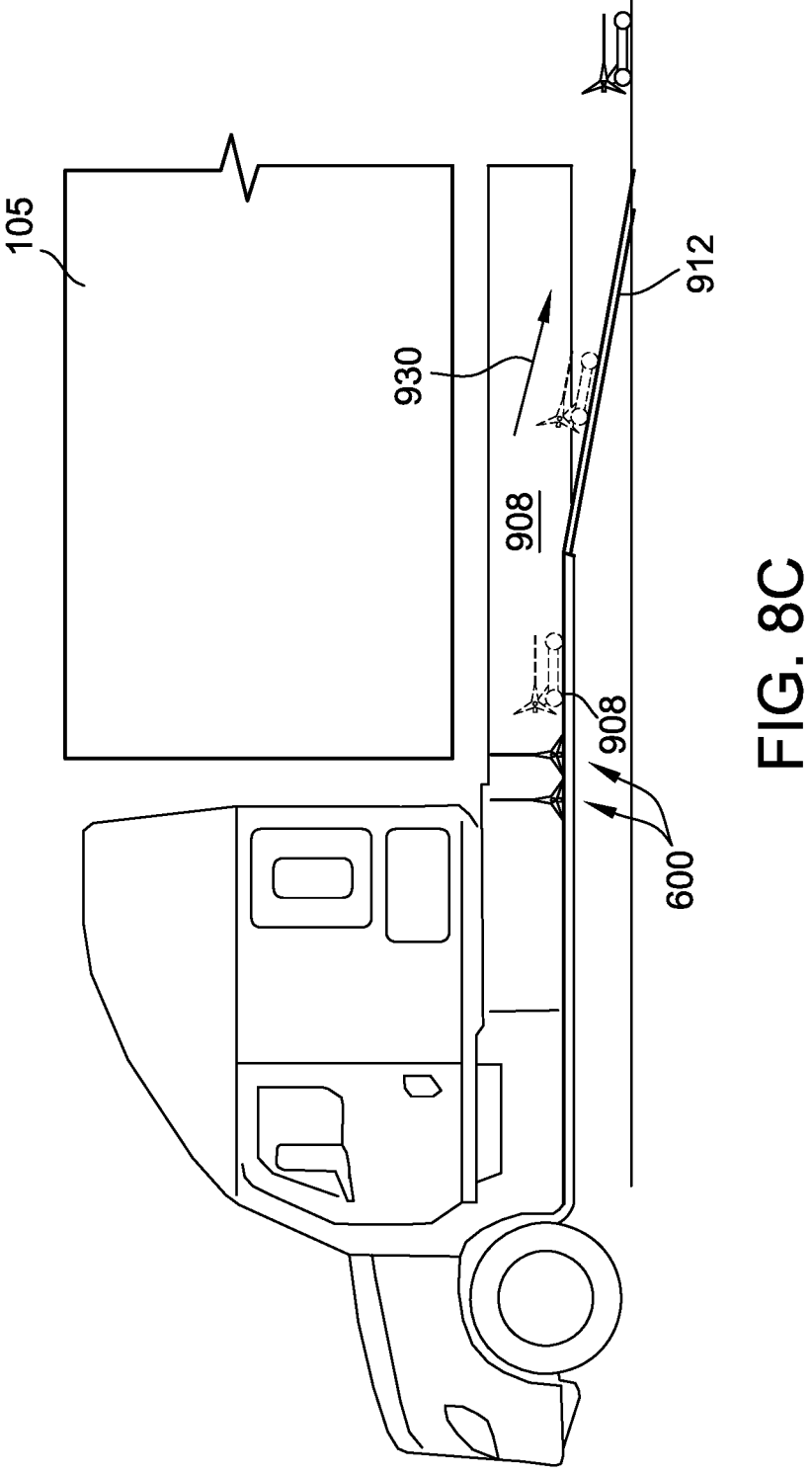
Figure 8D:
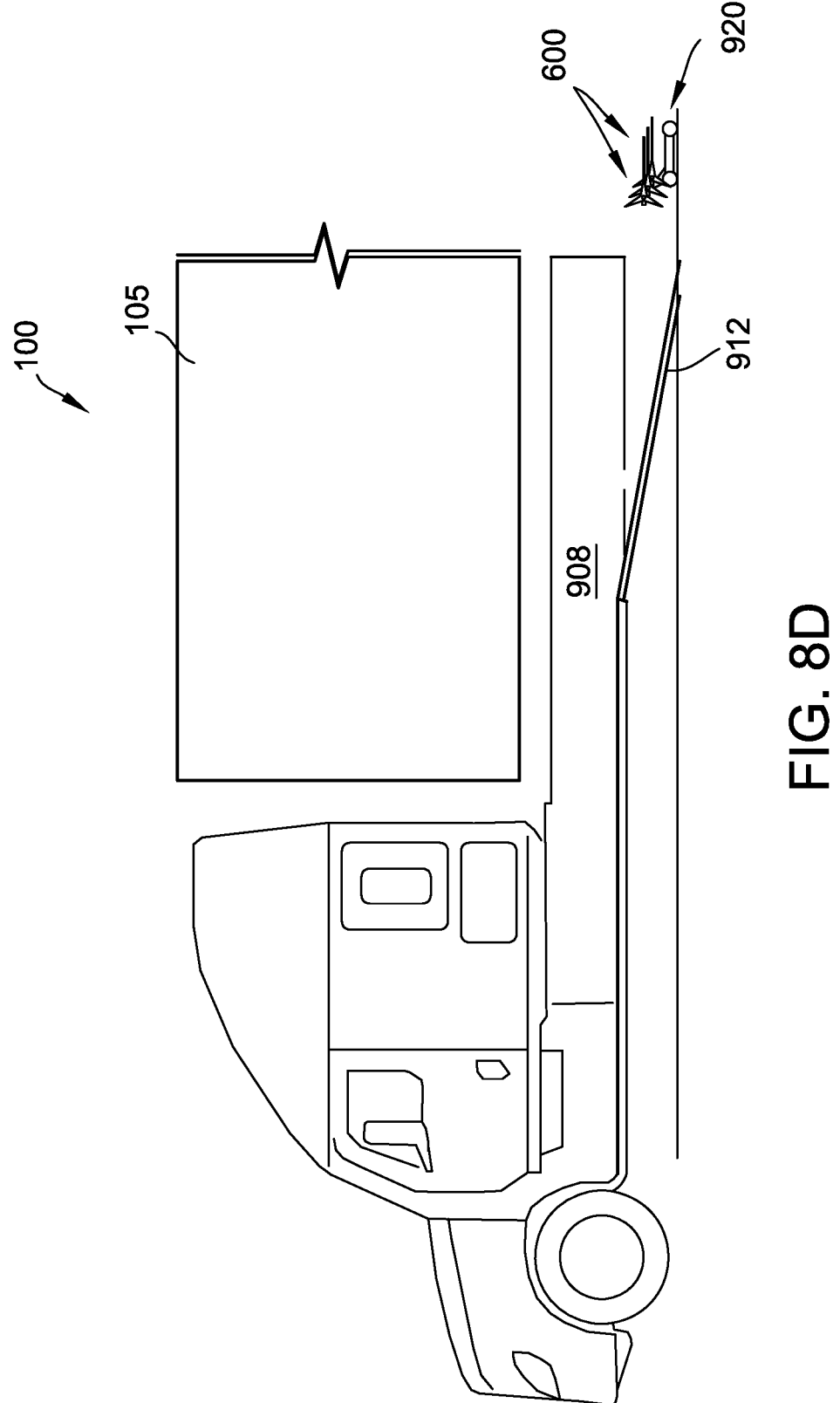

Operation of automatic marker deployment system 104 will be described. FIGS. 7A, 7B and 7C provide three exemplary emergency stops and the marker deployment associated with the exemplary emergency stops. The exemplary marker deployment shown in FIGS. 7A, 7B and 7C are based on industry guidelines. The marker deployment system may be utilized after any emergency stop is completed by the vehicle 100. FIG. 7A is a schematic representation of the marker deployment 400 associated with vehicle 100 after an emergency stop is completed along a two-lane road 401. FIG. 7B is a schematic representation of the marker deployment 402 associated with vehicle 100 after an emergency stop is completed along a divided highway 403. FIG. 7C is a schematic representation of the marker deployment 404 associated with the vehicle 100 after an emergency stop is completed along a stretch of road 405 with an associated obstructed view such as along a hill or curve.

Figure 11:
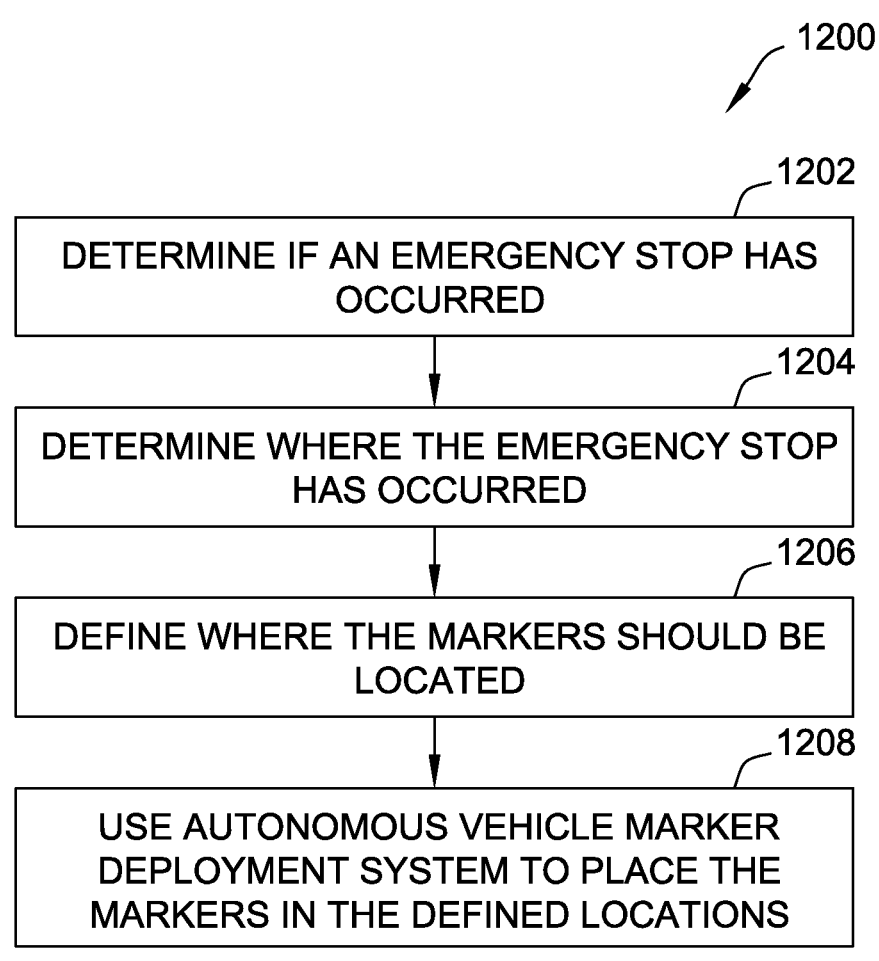
FIG. 11 is an exemplary flow chart representation of a method for locating markers near a vehicle using the automated marker deployment system according to the embodiments of the present disclosure.

Method 1200 for deploying markers 600 is presented in FIG. 11 As described above, the sensors 110 of the autonomy system 102 are continuously collecting and analyzing data and information relating to the operation and location of the autonomous vehicle 100. The deployment procedure is triggered when processing system 302 and/or computing device 312 of mission control computing system 324 determine 1202 that an emergency stop has been completed by the vehicle 100. In 1204, the data and information collected by the sensors 110 is analyzed to determine where the vehicle is located following the emergency stop, for example along a curve 405, a two-lane road 401 or along a divided highway 403. The location of the vehicle can be completed by comparing geolocation of the vehicle to a pre-determined map, or by using the latest available sensor data, or a combination of both. Once the system determines the location of the vehicle, in 1206 the autonomy system 102 determines the required locations of the markers 600. In 1206, The systems 102 may access marker location information stored in memory 306 and utilize the stored marker location information for a specific emergency stop location type.

In 1208 the marker deployment system is utilized to deploy the markers 600 on the associated road 401, 403, 405. The system 104 is powered using autonomy system 102. A signal is sent by the processing system 302 to activate the system 104. The processing system 302 may send a signal to any motors/other devices associated with the door or doors 508 to open the door and enable the arm to access the markers in the chamber 506. The arm 120 is extended and one or more markers 600 are collected from the chamber 506 by the arm at the end of tube 122-n. Using the deployment location data, the arm is selectively extended along the axis 242 as previously described to the length required to locate marker 600a along road 401. The arm 120a is shown in dashed font extended a length that enables marker 600a to be placed at location placement at d1, which may be 100 ft behind the vehicle. If required, the arm 120 may be telescopically retracted to obtain a second marker 600b from the chamber 506. If a second marker is connected to tube 122-n and obtaining a second marker 600b is not required, system 104 simply decreases the length of the arm 120, from length 120c to an arm length 120b, and locates the marker 600b at position d2 which may be 10 ft behind the vehicle. If the arm retrieved a marker from the chamber 506, the arm is extended to a length 120b where the marker is deployed. The arm 120b then retracts to the retracted orientation shown in FIG. 1B. Once fully retracted, the arm 120 rotates about axis 240 to be directed toward the front of vehicle 100. The arm retrieves a marker 600c from the chamber 506. The arm is then telescopically extended to a length 120c and places the marker 600c at location d3 which may be 100 ft in front of the vehicle 100. The deployment of markers associated with an emergency stop along a two-lane road 404 is the same as the deployment of markers after an emergency stop along a curved/obstructed view road 405 shown in FIG. 7C. Using self-righting markers 600, shown in FIGS. 4-6, when the markers are deployed, they land in the desired an upright orientation along the road. Some positions may not be reachable due to terrain or occlusion of the arm's extension by the wheels of the AV. In that case, the markers will be positioned at the nearest reasonable location that is accessible to the arm, or possibly omitted entirely.

In a divided highway 403, three markers 600a, 600b and 600c may be initially removed from the chamber or single markers may be removed each time a marker is to be deployed. The arm is initially extended a length 120a, and marker 600a is located at position d1 which may be 200 ft behind the vehicle 100. If other markers are supported by tube 122-n, the arm 120 is shortened from length 120a to length 120b, and marker 600b is located at position d2 which may be 100 ft behind the vehicle 100. The arm length is further shortened from length 120b to 120c and marker 600c is located at position d3 a distance of 10 feet from the vehicle 100. If markers are retrieved singly, after the marker 600a is deployed, the arm 120a is fully retracted and marker 600b is retrieved from the chamber. The arm is extended to length 120b and marker 600b is located at position d2. The arm 120b is then fully retracted, and marker 600c is removed from chamber 506. The arm is extended to length 120c and marker 600c is located at position d3. Using self-righting markers 600, shown in FIGS. 4-6, when the markers are deployed, they land in the desired an upright orientation along the road.

If the deployment system utilizes an arm 120 as shown in FIGS. 1C-1E, with telescoping tubes, the process described above for deploying markers at one end of the arm is repeated at the opposite end of the arm.

FIGS. 8A-8D and 9A-9C disclose alternate embodiment automatic marker deployment systems 904 and 1004 respectively of the present disclosure. Deployment systems 904 and 1004 are used in combination with the vehicle, 100, autonomy system 102, mission control system 324, and marker 600 as previously described. As a result, the previous details of their descriptions will not be repeated here and will be directed to specific aspects of the vehicle, systems 102, 324 and marker 600 that apply to deployment systems 904 and 1004.

Turning to FIGS. 8A, 8B, 8C, and 8D an autonomous vehicle that includes automatic marker deployment system 904 is disclosed. The vehicle includes frame 107 that includes a support frame 906 that is formed in the frame 107. In an alternate disclosure of system 904, the support frame may be formed in the frame. The frame 107 defines a chamber 908. The frame includes a support base 910 that includes a movable ramp 912. The ramp is connected by a hinge to the support base 910 and is moveable toward and away from the support base by a motor or other means for moving the ramp 912. The ramp is shown in the lowered position in FIG. 7Bb with the end of the ramp in contact with road surface 900.

The system 904 uses placement device 920 to deliver markers 600 to the defined locations along the road when the vehicle completes an emergency stop. The placement device is a drone and more specifically a remote-controlled vehicle such as a remote-controlled car. Between uses, the remote-controlled vehicle may be recharged using charging pad 914 that is provided on support base 910. When coupled on the charging pad 914, the vehicle is recharged using the batteries associated with the drive system for vehicle 100.

In use, a marker is loaded on or by vehicle 920 and a command signal is sent to the vehicle from the autonomy system 102 or mission control 324. The vehicle is controlled to move from chamber 908 and down ramp 912 in direction 930. The vehicle 920 may be controlled to the defined location for marker placement. Once at the desired location, the vehicle drops the marker in the required location. The self-orienting marker 600 assumes a vertical orientation when it is dropped by or otherwise unloaded from vehicle 920. The vehicle then returns to the chamber to obtain another marker. In an alternate embodiment of the disclosure shown in FIG. 9D, the remote-controlled vehicle 920 may include multiple markers 600 on the vehicle as the vehicle exits the chamber 908. When the vehicle includes more than one marker, the markers may be unloaded in the defined marker locations without the need to return to the chamber to obtain additional markers for deployment near vehicle 100. Vehicle 920 may be controlled using the sensors on board the vehicle 100. In the preferred exemplary embodiment limited use of vehicle sensors is made to confirm the location of the sensor such as an IMU, mono camera or LiDAR and RADAR could also be used.

Figure 9A:
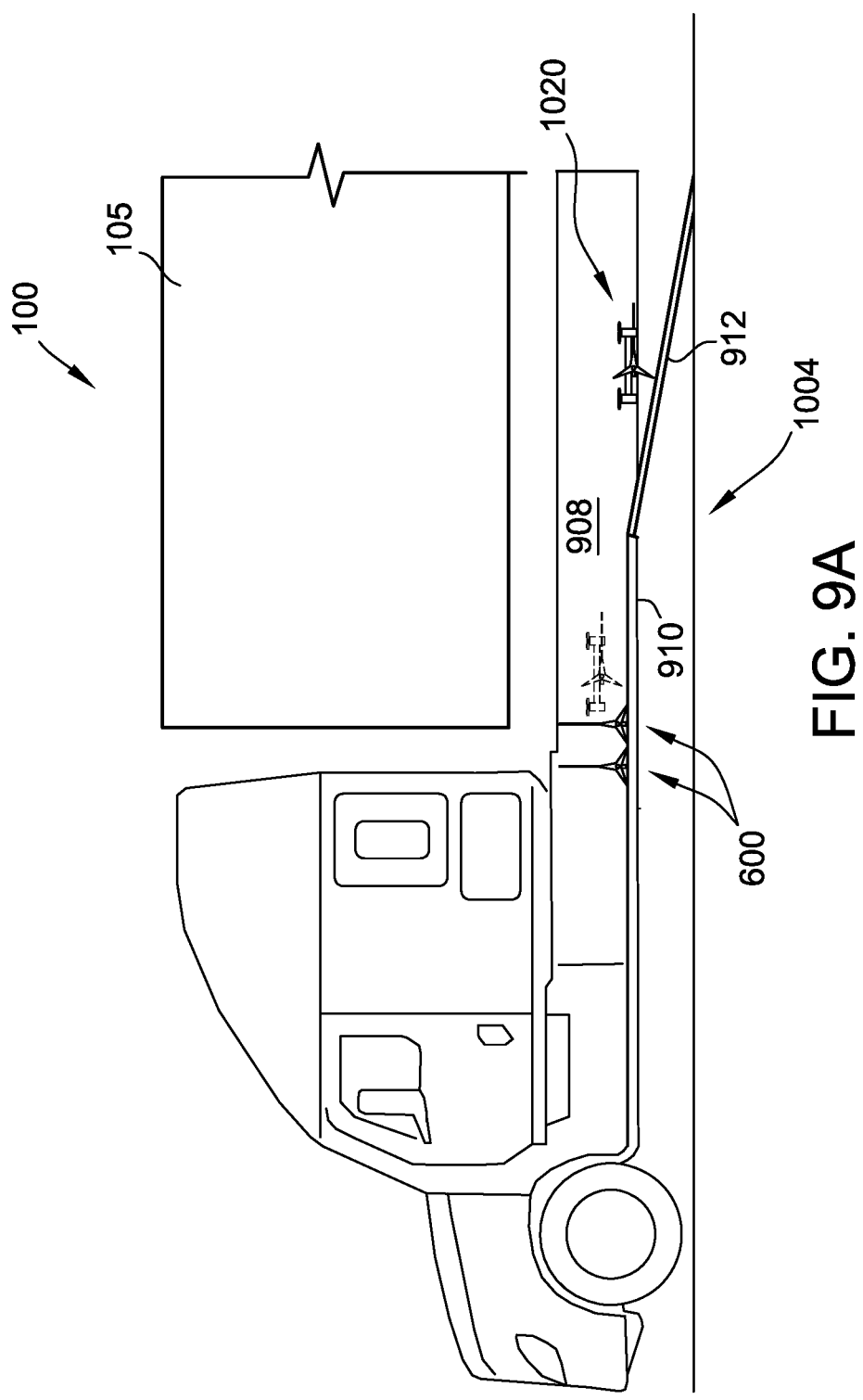
FIGS. 9A-9C are schematic views of a vehicle such as a truck that includes an alternate embodiment marker deployment system utilizing a drone to deploy markers according to embodiments of the present disclosure.
Figure 9B:
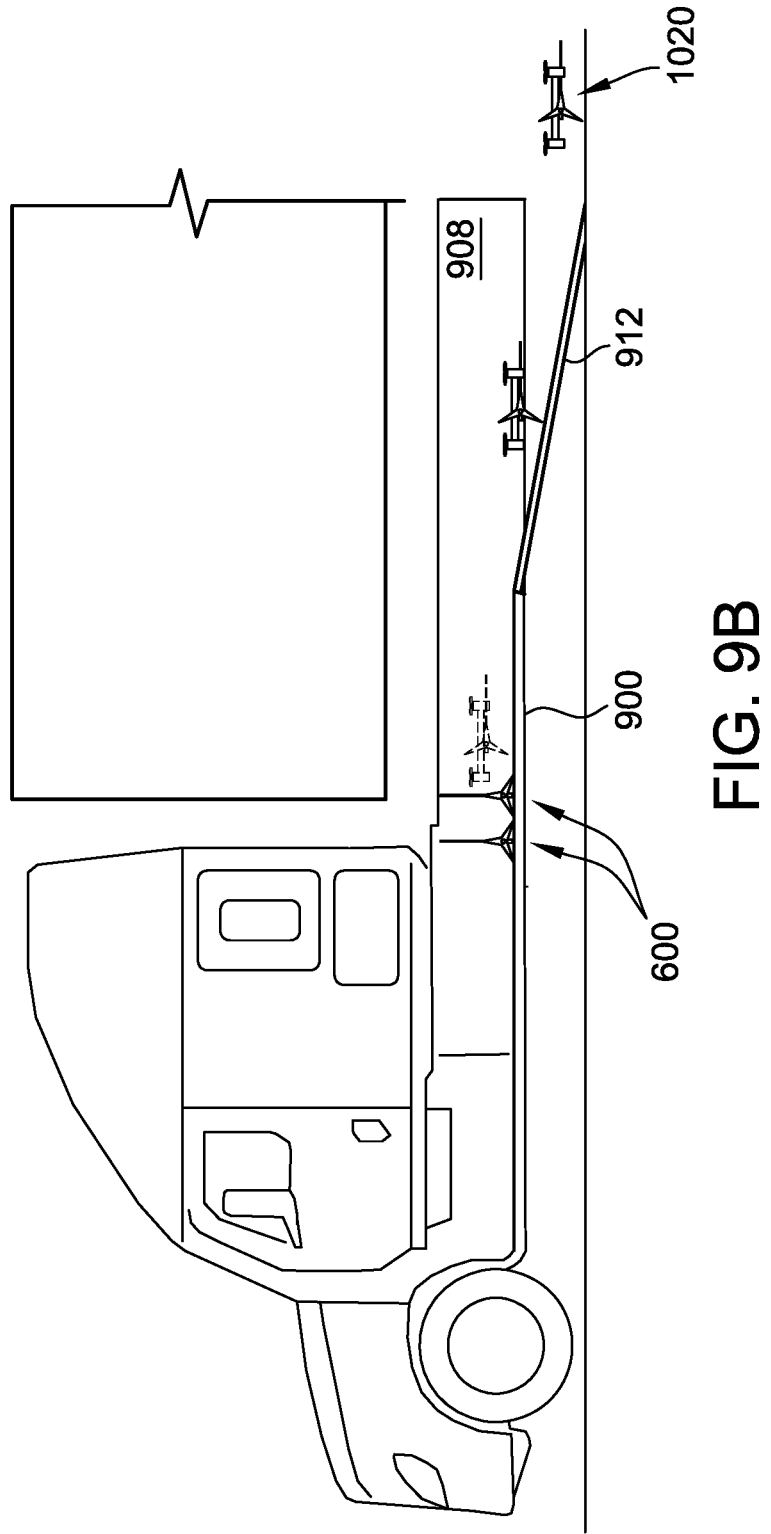
Figure 9C:
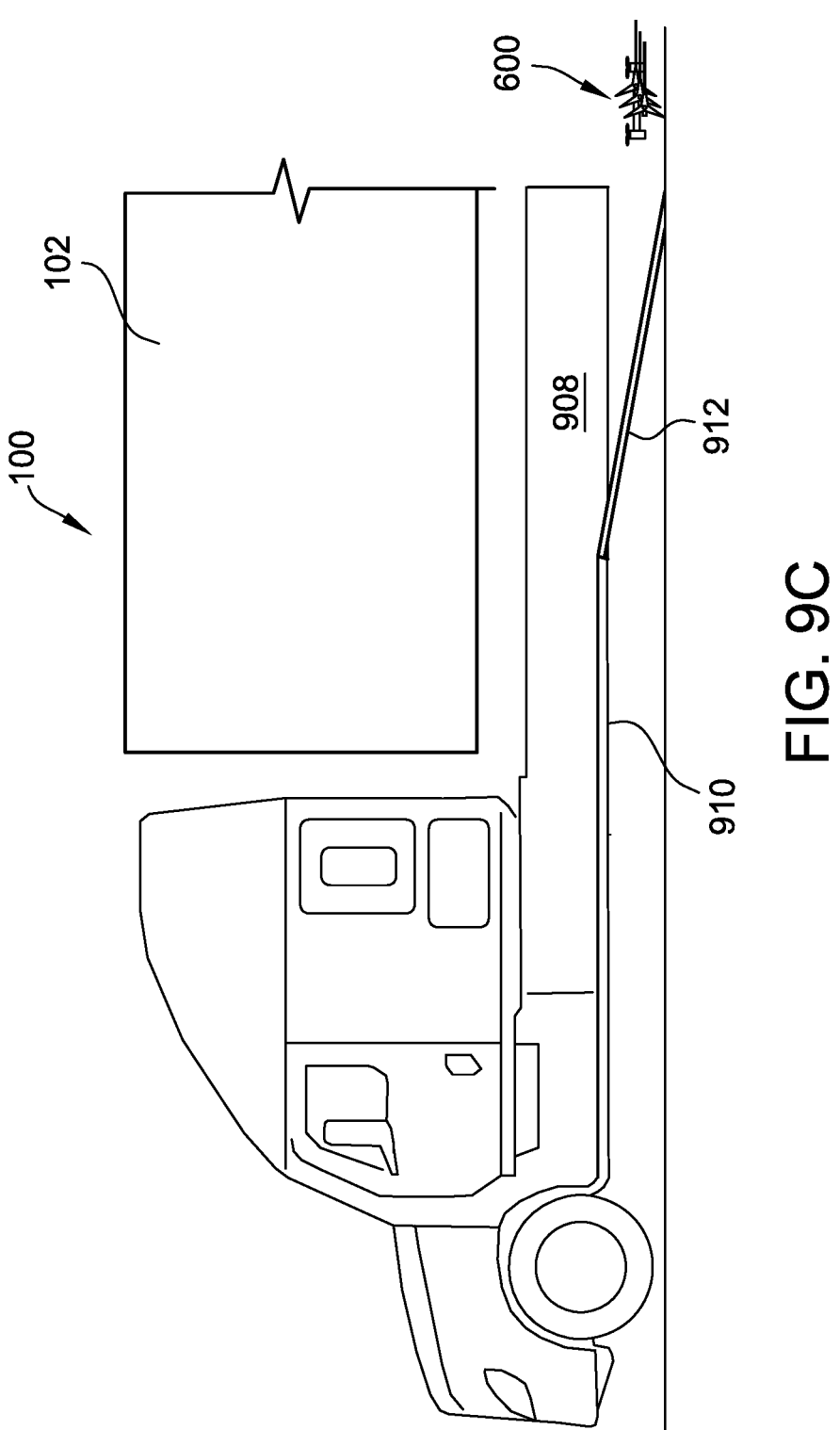

FIGS. 9A-9C show an alternate embodiment of the present disclosure that includes marker deployment system 1004. The marker deployment system 1004 includes the support frame that defines chamber 908. The support frame includes base 910 that further includes movable ramp 912 that is movable toward and away from the base. Marker placement device 1020 comprises a flying drone. As shown in FIG. 9A, the flying drone may collect and deliver a single marker 600, each trip from the chamber 908 or may collect and deliver a plurality of markers 600 as shown in FIG. 9C. The markers may be releasably supported on the drone 1020 by a hook, claw, peg or other suitable means of connection whereby the flying drones 1020 may transport the markers from the chamber to the locations defined for locating the markers near the vehicle and deposit them by releasing the marker.

Figure 10A:
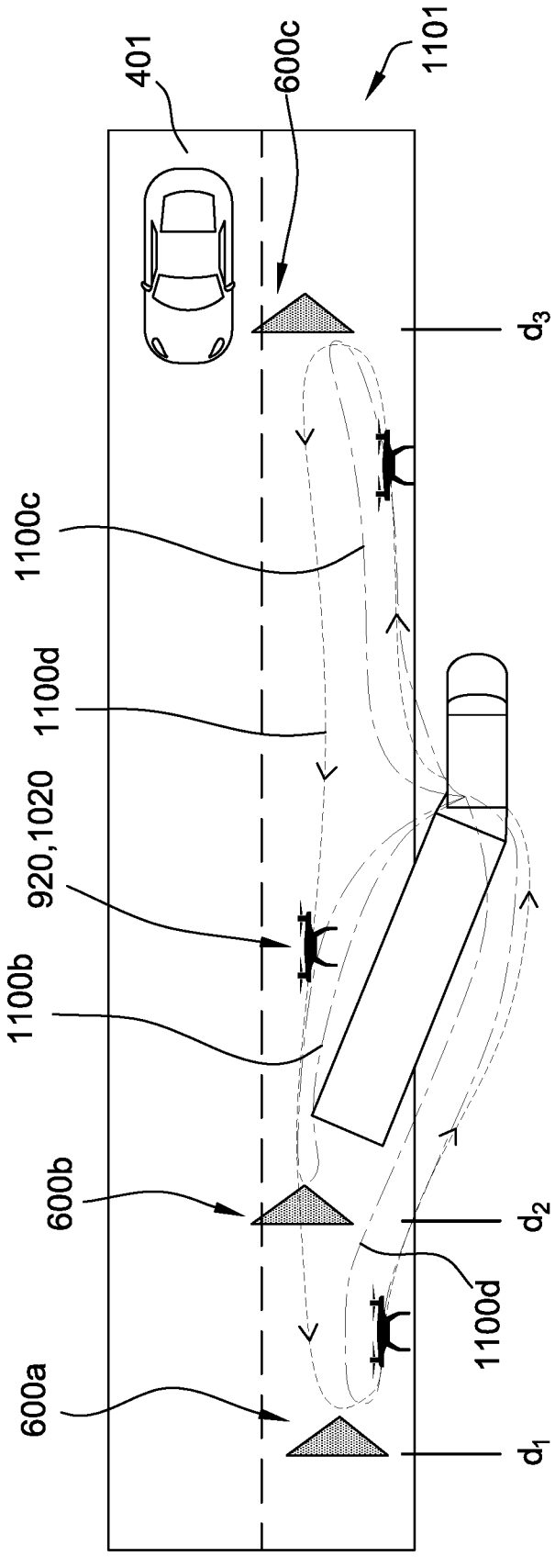
FIGS. 10A-10C disclose various vehicle exemplary emergency stops, and the locations of the markers placed by the marker deployment system in response to the emergency stops according to embodiments of the present disclosure.
Figure 10B:
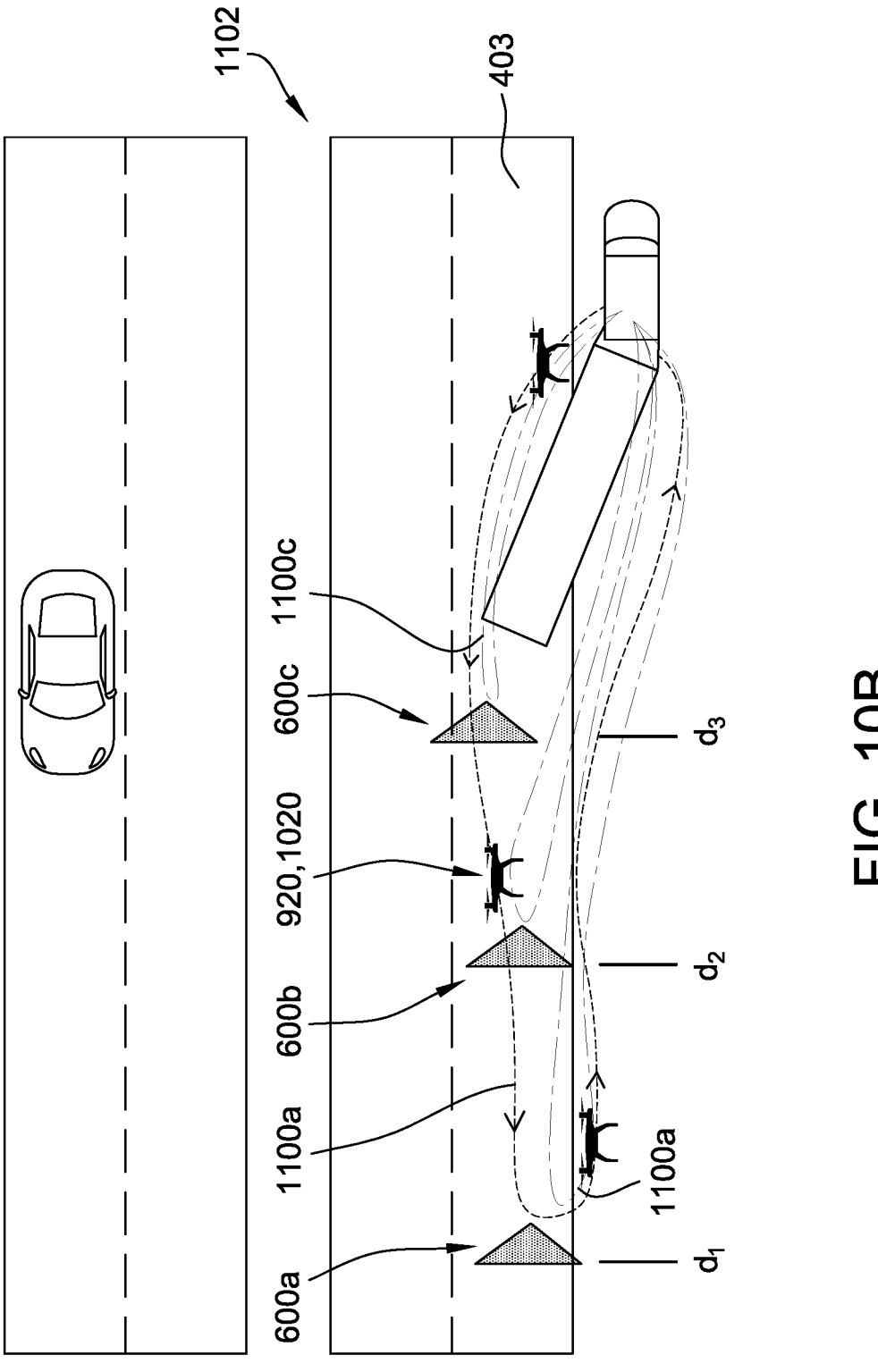
Figure 10C:
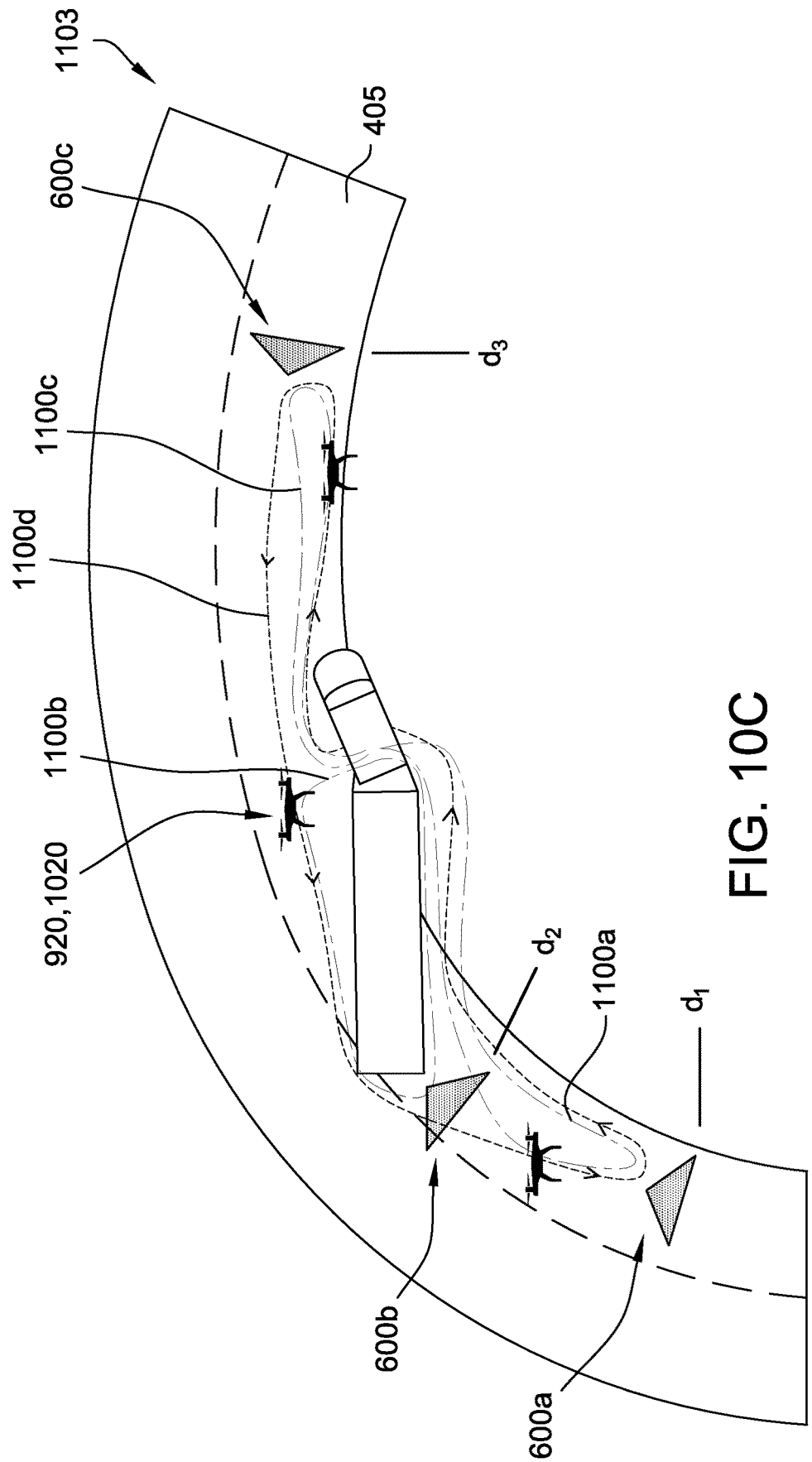

The method 1200 is applied when the placement devices 920 and 1020 are used to deploy the markers. A flying drone 1020 is shown in FIGS. 10A-10C. However it should be understood that although a flying drone is shown schematically in FIGS. 10A-10C, the methodology for deploying the markers 600 shown in FIGS. 10A-10C may also be applied to drone 920. Operation of automatic marker deployment systems 904, 10004 will be described. FIGS. 10A, 10B and 10C provide three exemplary emergency stops and the marker deployment associated with the exemplary emergency stops. The marker deployment system may be utilized after any emergency stop is completed by the vehicle 100. FIG. 10A is a schematic representation of the marker deployment 1101 associated with vehicle 100 after an emergency stop is completed along a two-lane road 401. FIG. 10B is a schematic representation of the marker deployment 1102 associated with vehicle 100 after an emergency stop is completed along a divided highway 403. FIG. 10C is a schematic representation of the marker deployment 1103 associated with the vehicle 100 after an emergency stop is completed along a stretch of road 405 with an associated obstructed view such as along a hill or curve.

The placement devices 920, 1020 may transport a single marker 600 from the chamber 908 to the defined location and after the marker is deployed may then return to the chamber to collect another marker to be located near the vehicle. Alternatively, a plurality of markers may be transported by the placement devices 920, 1020. After receiving a signal from the controller 302 that an emergency stop has occurred, the drone 920, 1020 is powered and loaded with one or a plurality of markers. The ramp 912 is also lowered by the controller. A signal is communicated to the motors/other devices that reposition the ramp. As shown in emergency stop schematics shown in FIGS. 10A, 10B and 10C the drone makes a series of closed delivery loops from the chamber 908 to the defined location the marker is to be deployed d1, d2, d3 and back to the chamber to obtain another marker. As shown in each of FIGS. 10A, 10B and 10C, the drones 920, 1020 make delivery loops 1100a, 1100b, and 1100c to locate respective markers 600a, 600b and 600c in the desired locations on the roads 401, 403 and 405. In each emergency stop, if the drone leaves the chamber with a plurality of markers 600, the drone makes a single loop 1100. In marker deployment 1101 in FIG. 10A, the delivery loop begins as the drone leaves chamber 908, drops marker 600b at location d2. The drone continues to location d1 and locates a marker 600a at d1. The drone continues to location d3 and at upon reaching location d3 places marker 600c at location d3. The drone then returns to the chamber. In marker deployment 1102, in FIG. 10B, the drone leaves the chamber 908 and delivers marker 600c at location d3. The drone then continues to location d2 and places marker 600b at d2. Finally, the drone continues to defined location d1 and locates marker 600a at location d1. The drone then returns to the chamber 908. In marker deployment 1103, in FIG. 10C, the drone leaves the chamber 908 and delivers marker 600b at defined location d2. The drone then continues to defined location d1 and places marker 600a at d1. Finally, the drone continues to defined location d3 and locates marker 600c at location d3. The drone then returns to the chamber 908.

In all marker deployment methods described, after the drone returns to the chamber, the ramp is raised, and the drone is recharged by batteries of drive system 304.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed:

1. An autonomous vehicle comprising:
a frame including a support frame; at least one marker supported by the support frame;
a marker deployment system, the marker deployment system including a placement device for locating each of the at least one markers from the support frame to a desired location relative to the vehicle; and
an autonomy system comprising a processor and a memory device, the processor programmed to:
receive sensor data from at least one sensor positioned on the autonomous vehicle;
in response to determining that an emergency stop has been performed, determine the desired location relative to the autonomous vehicle for the at least one marker based on the received sensor data; and
warn other vehicles of the emergency stop by transmitting signals to the placement device, the signals causing the placement device to locate each of the at least one markers at the desired location relative to the autonomous vehicle.

2. The autonomous vehicle of claim 1 wherein the placement device comprises a movable arm that removes at least one of the at least one marker from a support base of the support frame to be located relative to the vehicle.

3. The autonomous vehicle of claim 2 wherein the moveable arm further comprises a telescoping arm that is extendable and retractable.

4. The autonomous vehicle of claim 3 wherein the telescoping arm is comprised of a first member and a second member, the second member being movable relative to the first member between a retracted position wherein the second member is nested within the first member and a second position wherein the second member is extended and located outside of the first member.

5. The autonomous vehicle of claim 3 wherein the movable arm has two ends, a telescoping arm being located at each of the ends.

6. The autonomous vehicle of claim 5 wherein the arm is movably fixed to the frame between the ends of the autonomous vehicle.

7. The autonomous vehicle of claim 6 wherein the arm is located proximate to a rear of the vehicle.

8. The autonomous vehicle of claim 6 wherein the arm is located closer to a front of the vehicle than a rear of the vehicle.

9. The autonomous vehicle of claim 2, wherein the movable arm comprises a telescoping arm that is comprised of a plurality of tubes that are extendable and retractable.

10. The autonomous vehicle of claim 2 wherein the movable arm is rotatable about an axis of rotation and extendable and retractable along a displacement axis.

11. The autonomous vehicle of claim 2 wherein the movable arm has a free end, a support member being located proximate the free end to support the movable arm when the movable arm is extended.

12. The autonomous vehicle of claim 11 wherein the support member is a wheel.

13. The autonomous vehicle of claim 1 wherein the device comprises a motor that moves an arm in response to the signals received from the processor.

14. The autonomous vehicle of claim 1 wherein the support frame comprises a base, an upper wall and sidewalls, the upper wall, sidewalls and the base defining a chamber, the markers being located on the base and in the chamber.

15. The autonomous vehicle of claim 14 wherein opposed ends of the support frame are open and accessible by the placement device to remove at least one marker from the chamber.

16. A system for detecting an emergency stop in an autonomous vehicle and locating at least one marker relative to the autonomous vehicle in response to the emergency stop, the system comprising:

at least one sensor positioned on the autonomous vehicle, the at least one sensor for collecting operation-related data for the autonomous vehicle;

a marker deployment system comprising a placement device for locating the at least one marker in a desired location relative to the autonomous vehicle;

an autonomy system, the autonomy system including a processor and a memory device, the processor programmed to:

receive, from the at least one sensor, at least one sensor signal representing the operation-related data for the autonomous vehicle;

based on the received at least one sensor signal, determine if an emergency stop has been performed by the autonomous vehicle;

in response to determining that the emergency stop has been performed, determine the desired location relative to the autonomous vehicle for the at least one marker based on the received at least one sensor signal; and control the device of the marker deployment system to locate the at least one marker to a desired location relative to the vehicle.

17. The system of claim 16 wherein the placement device comprises a movable arm that removes at least one of the at least one marker from a support base to be located relative to the vehicle.

18. The system of claim 17 wherein the moveable arm further comprises a telescoping arm that is extendable and retractable.

19. The system of claim 18 wherein the telescoping arm is comprised of a first member and a second member, the second member being movable relative the first member between a retracted position wherein the second member is nested within the first member and a second position wherein the second member is extended and located outside of the first member.

20. The of system claim 17, wherein the movable arm comprises a telescoping arm that is comprised of a plurality of tubes that are extendable and retractable.

* * * * *